Dec. 21, 1954     R. I. ROTH     2,697,649
CARD TO FILM AND FILM TO CARD MACHINE
Filed April 19, 1949     26 Sheets-Sheet 1
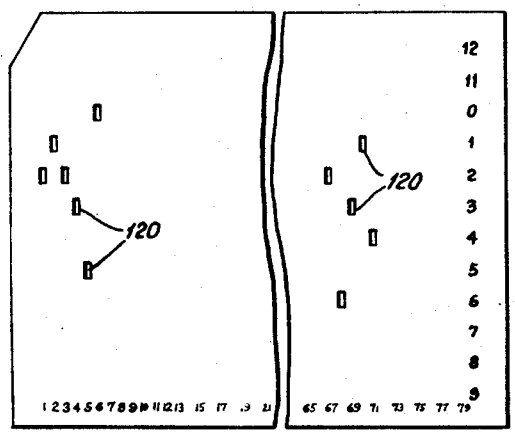
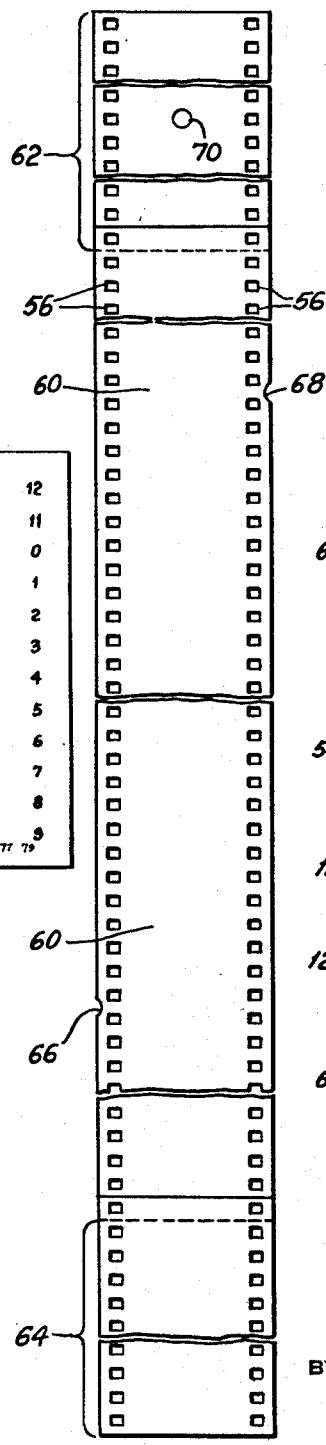
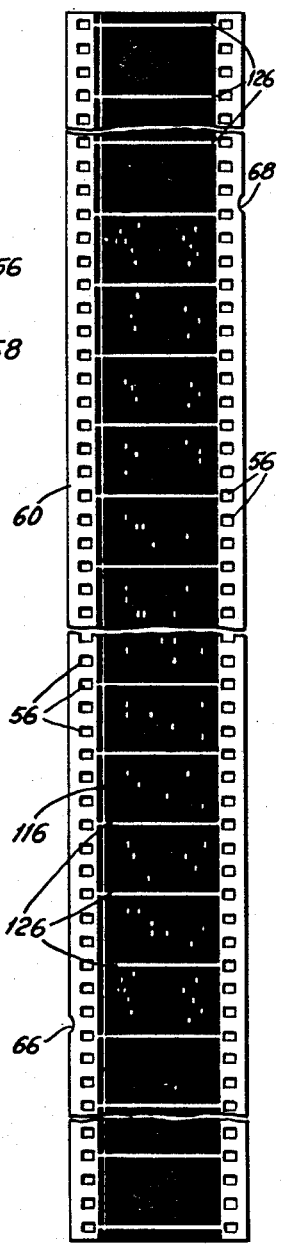
INVENTOR
ROBERT I. ROTH
BY
ATTORNEY Dec. 21, 1954  R. I. ROTH  2,697,649
CARD TO FILM AND FILM TO CARD MACHINE
Filed April 19, 1949  26 Sheets-Sheet 2

INVENTOR
ROBERT I. ROTH
BY *Robert S. Dunham*
ATTORNEY

Dec. 21, 1954   R. I. ROTH   2,697,649
CARD TO FILM AND FILM TO CARD MACHINE
Filed April 19, 1949   26 Sheets-Sheet 3
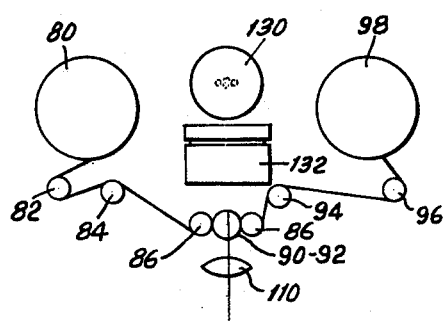
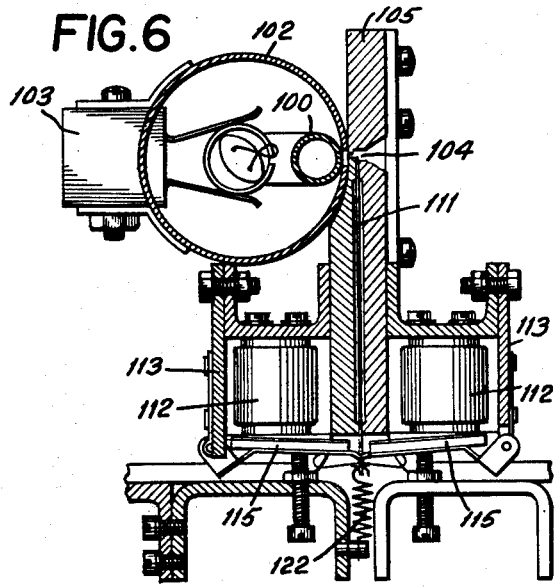
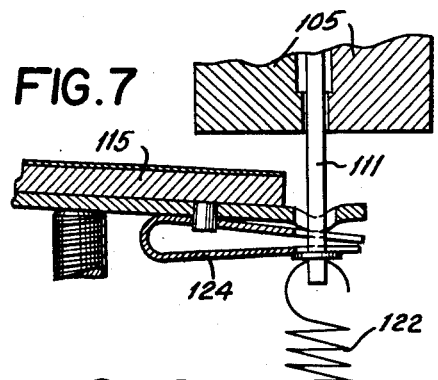
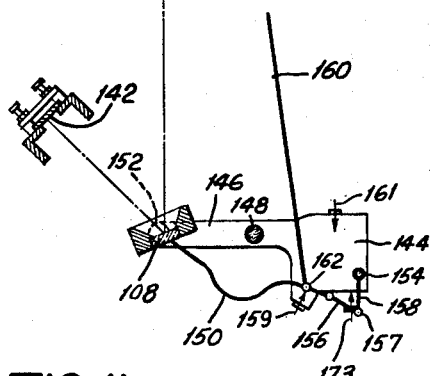
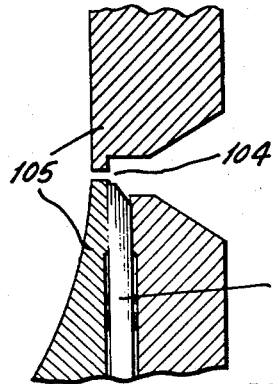
INVENTOR.
ROBERT I. ROTH
BY Robert S. Dunham
ATTORNEY.

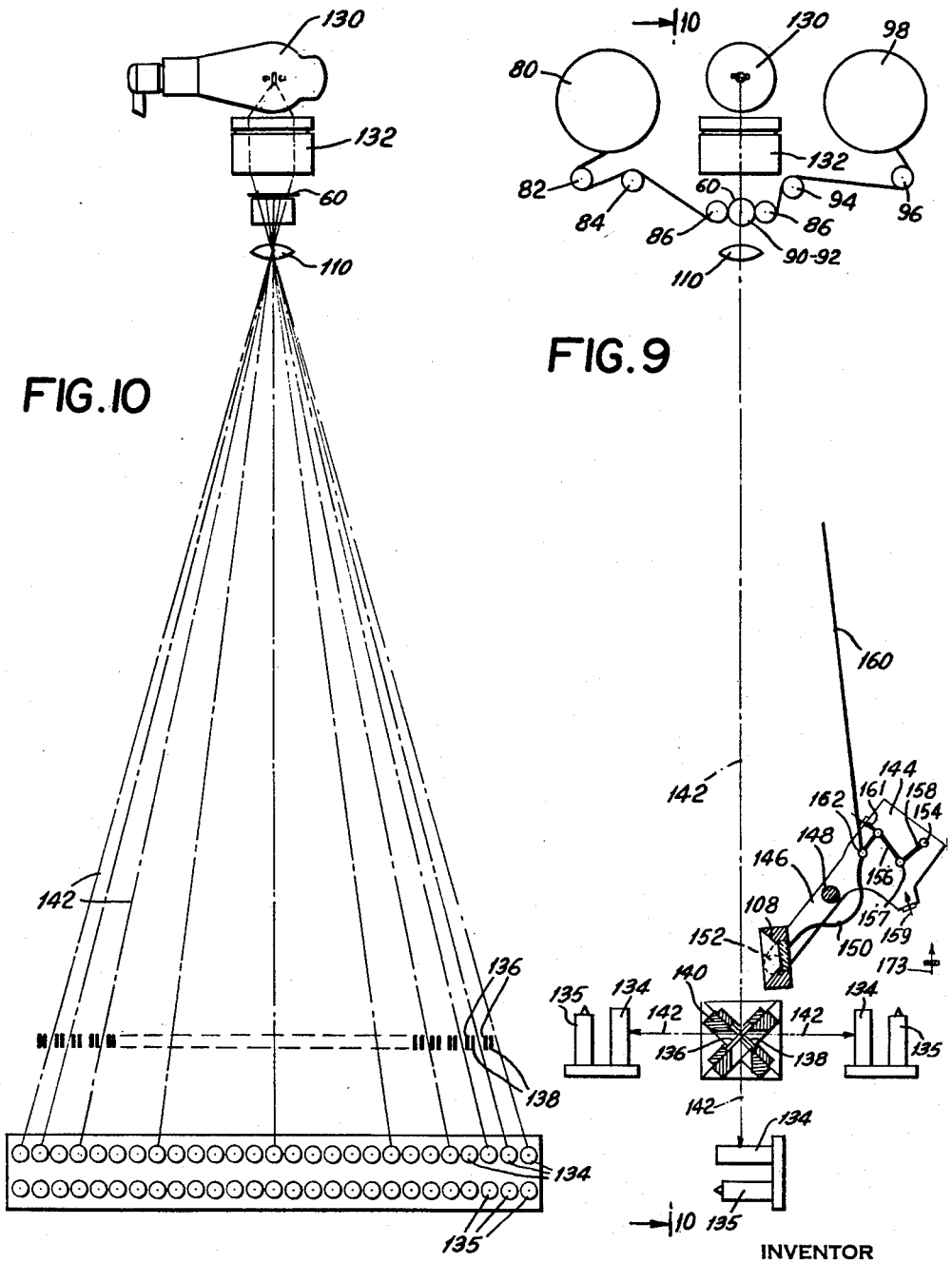

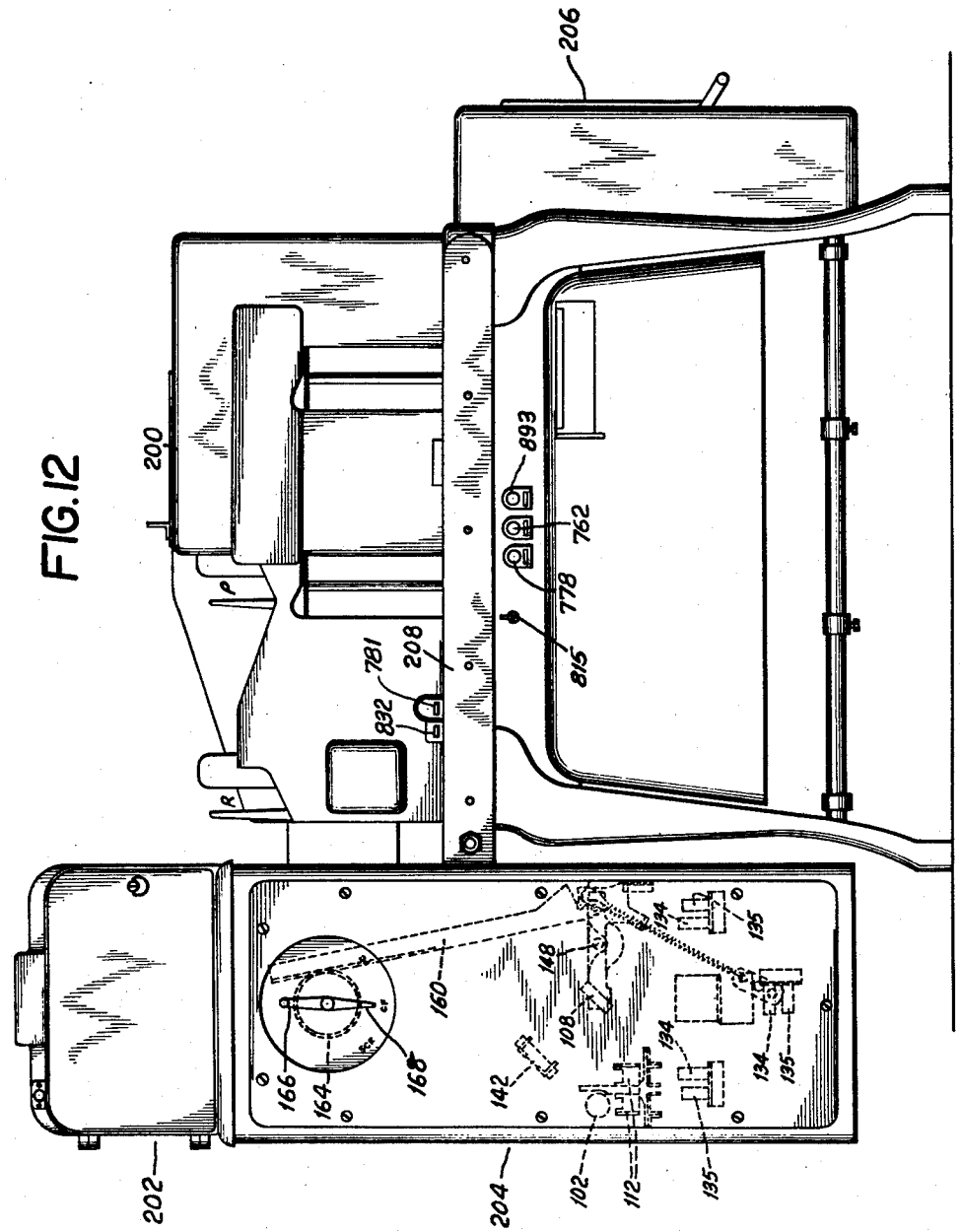

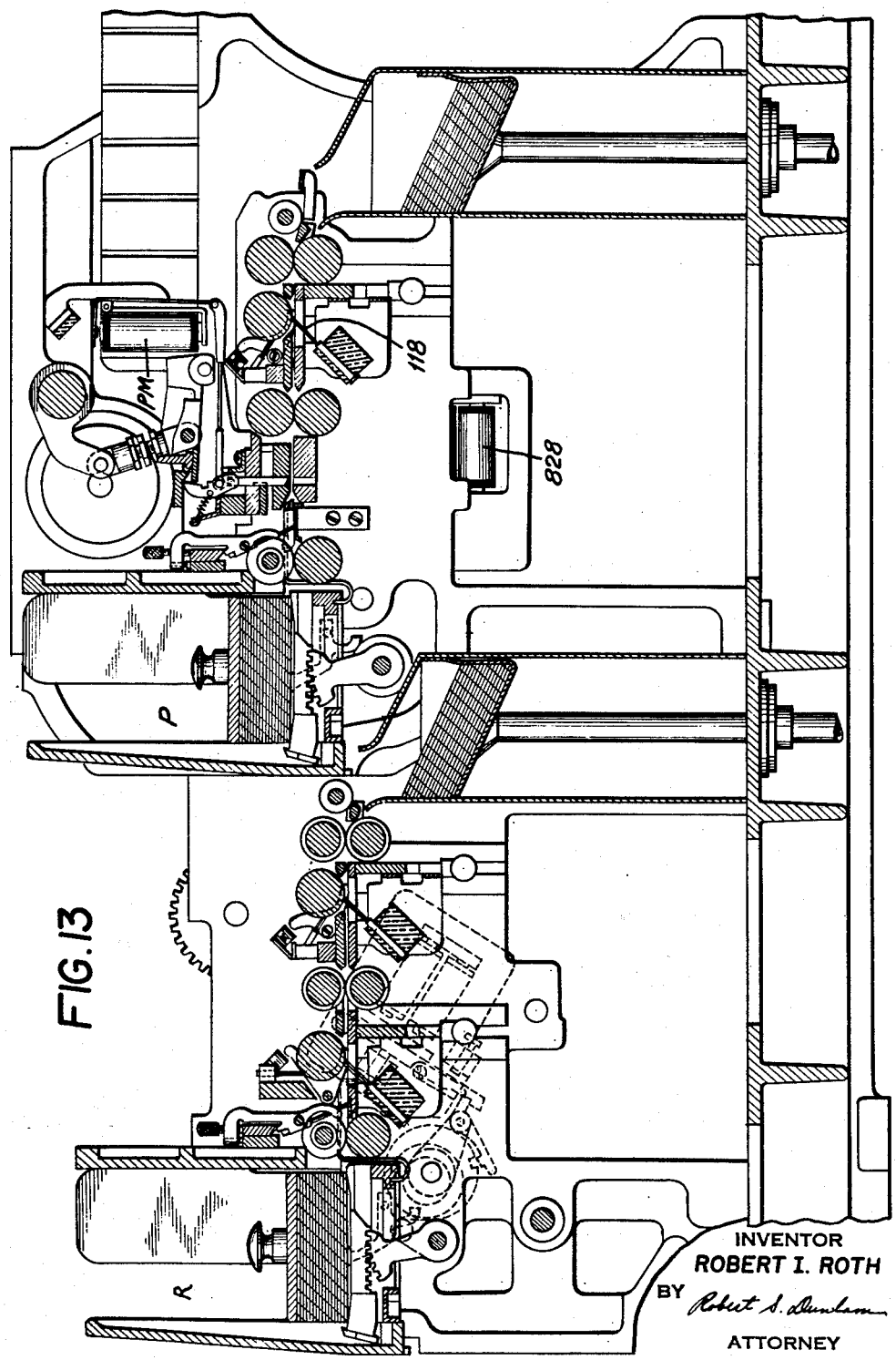

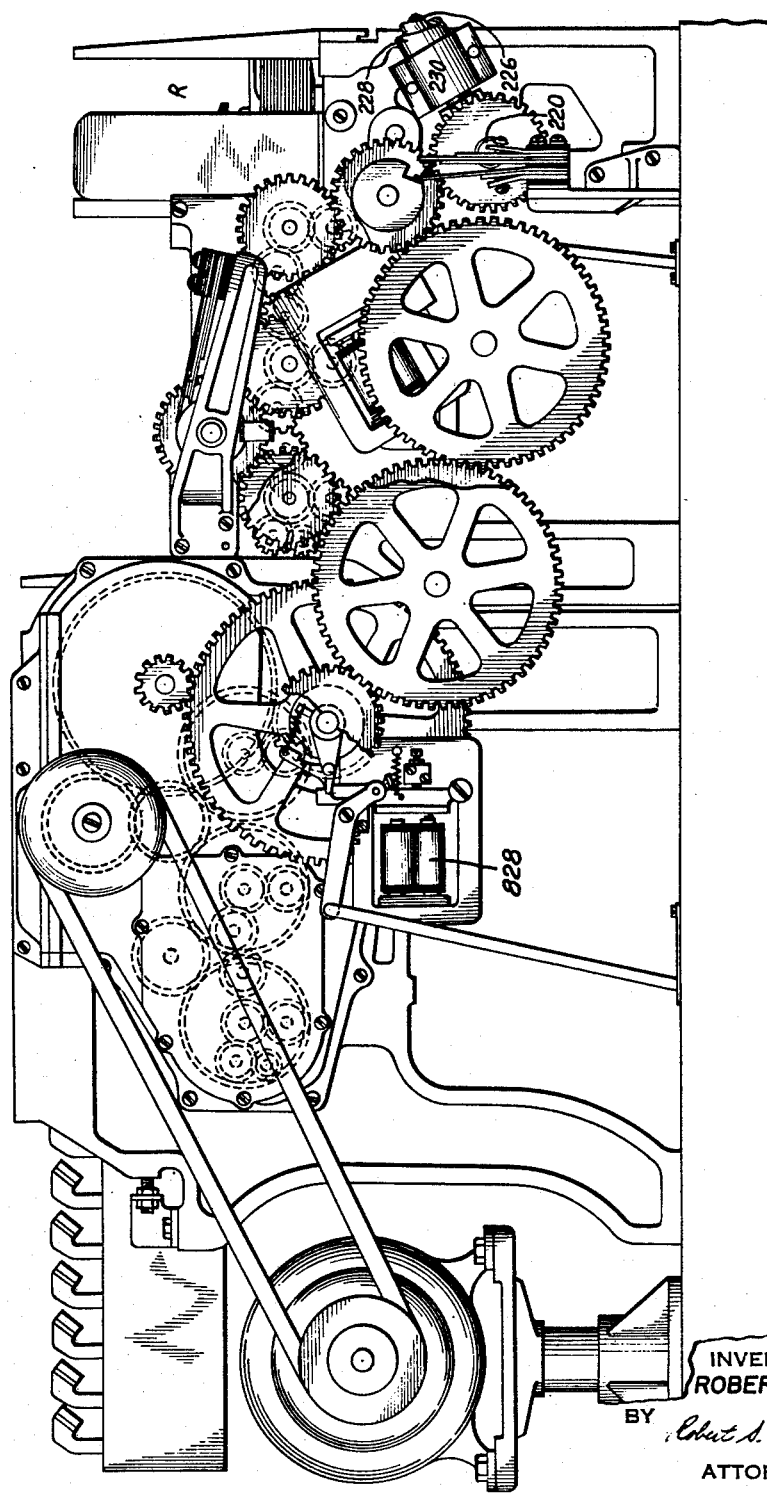

Dec. 21, 1954   R. I. ROTH   2,697,649
CARD TO FILM AND FILM TO CARD MACHINE
Filed April 19, 1949   26 Sheets-Sheet 8

INVENTOR
ROBERT I. ROTH
BY
ATTORNEY

Dec. 21, 1954     R. I. ROTH     2,697,649
CARD TO FILM AND FILM TO CARD MACHINE
Filed April 19, 1949     26 Sheets-Sheet 9
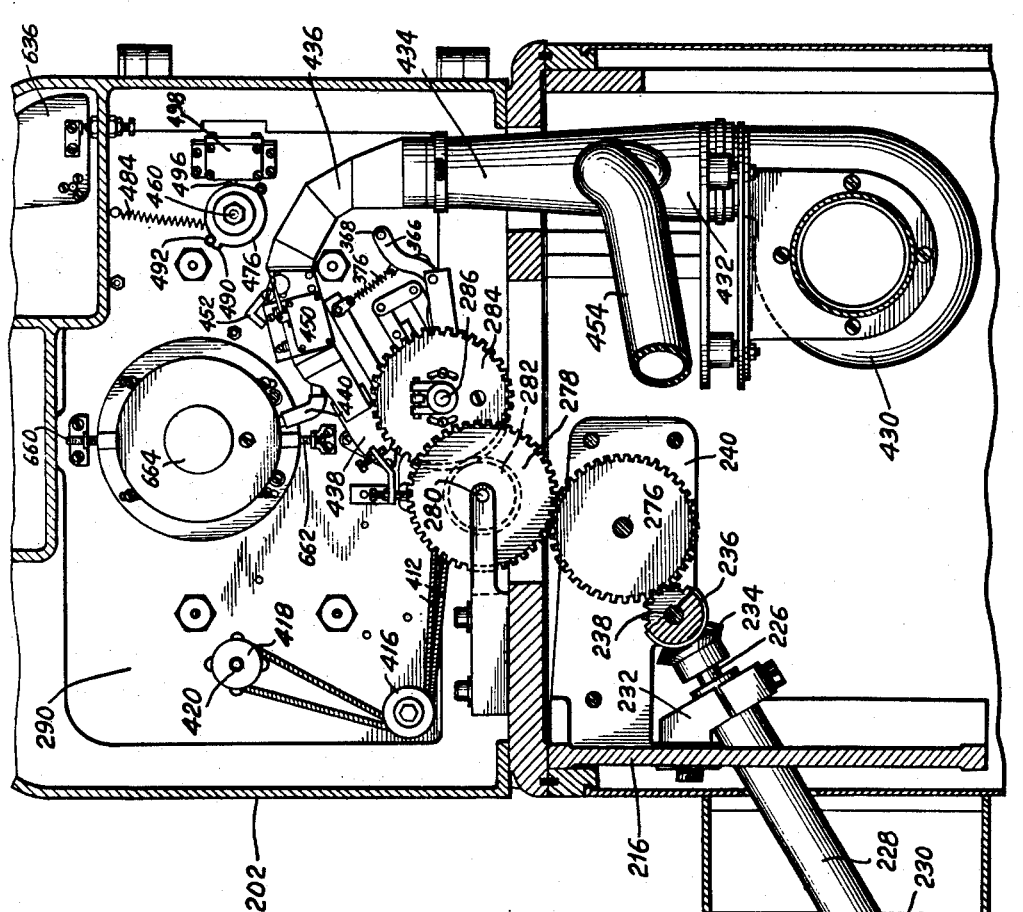
FIG.16
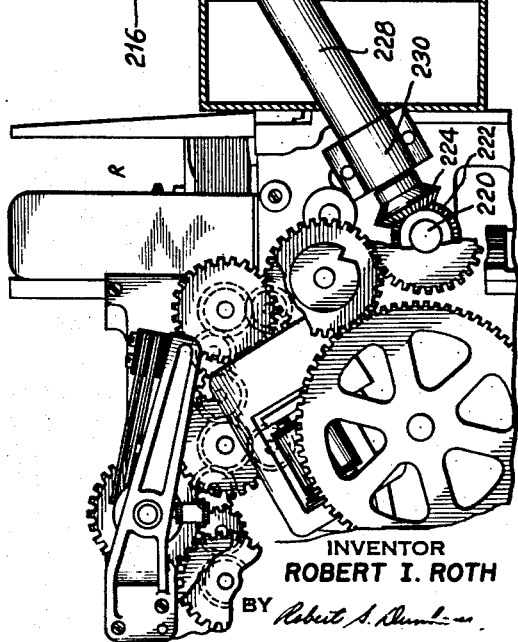
INVENTOR
ROBERT I. ROTH
BY
ATTORNEY

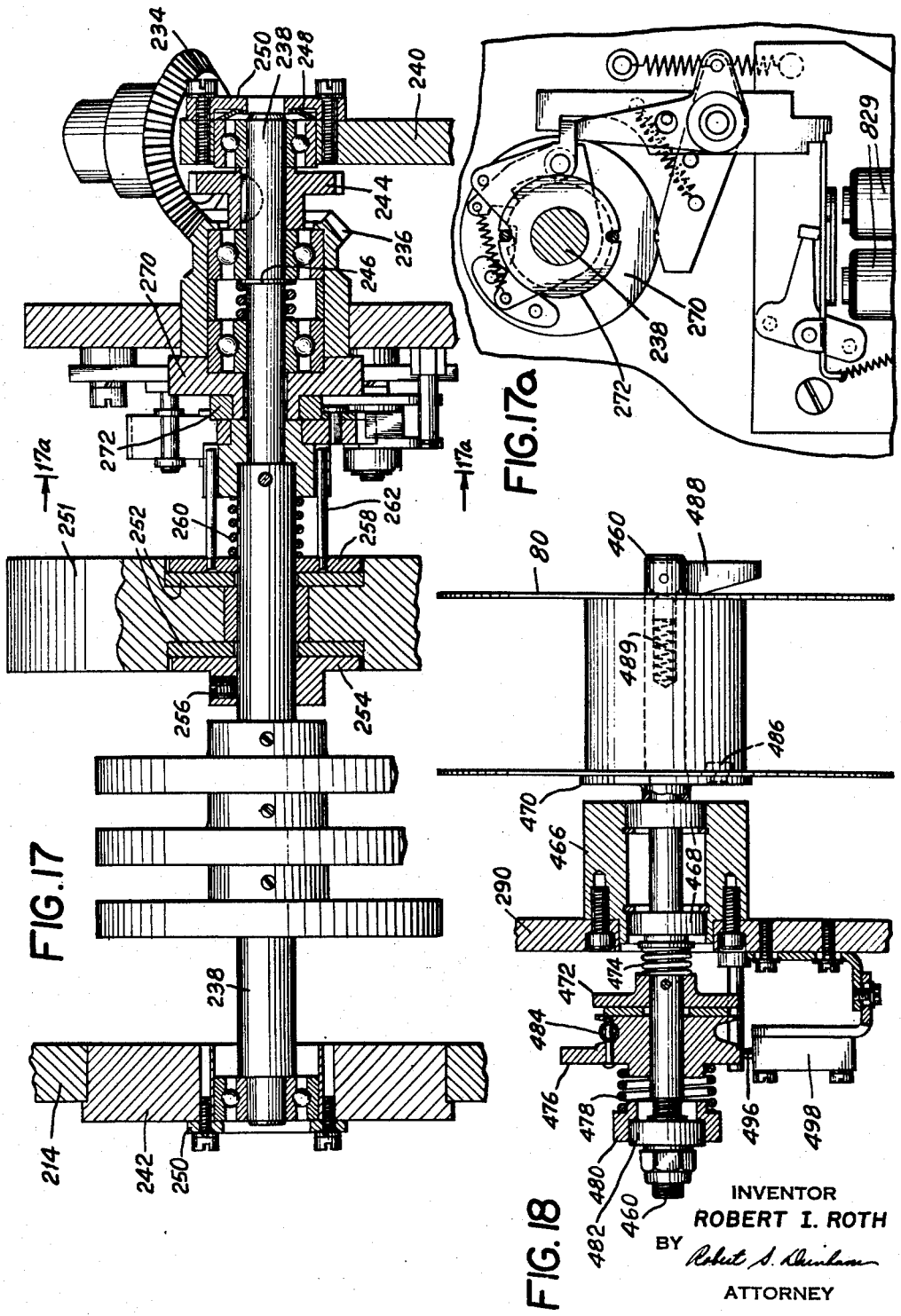

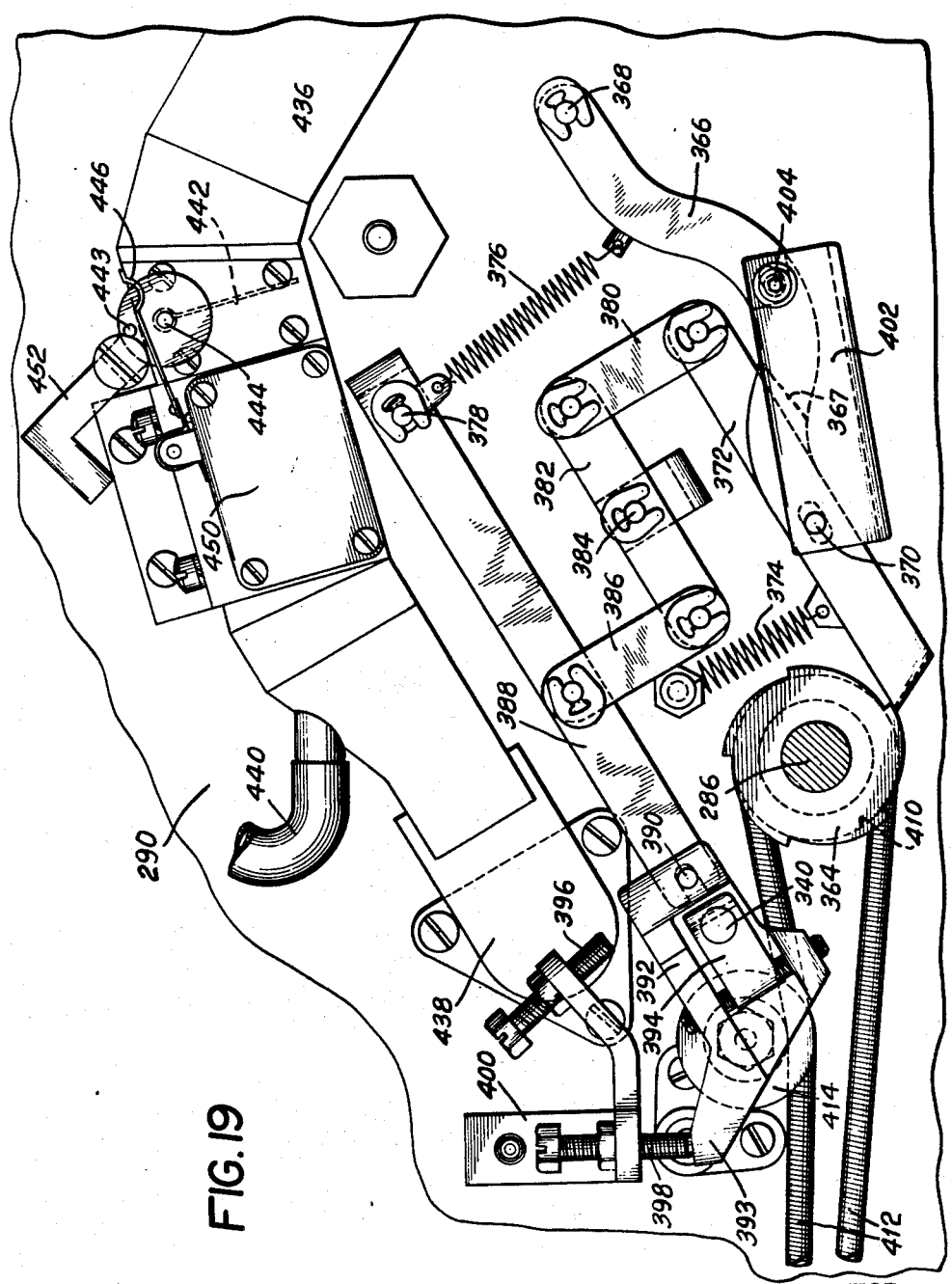

Dec. 21, 1954   R. I. ROTH   2,697,649
CARD TO FILM AND FILM TO CARD MACHINE
Filed April 19, 1949   26 Sheets-Sheet 12

INVENTOR
ROBERT I. ROTH
BY *Robert S. Dunham*
ATTORNEY

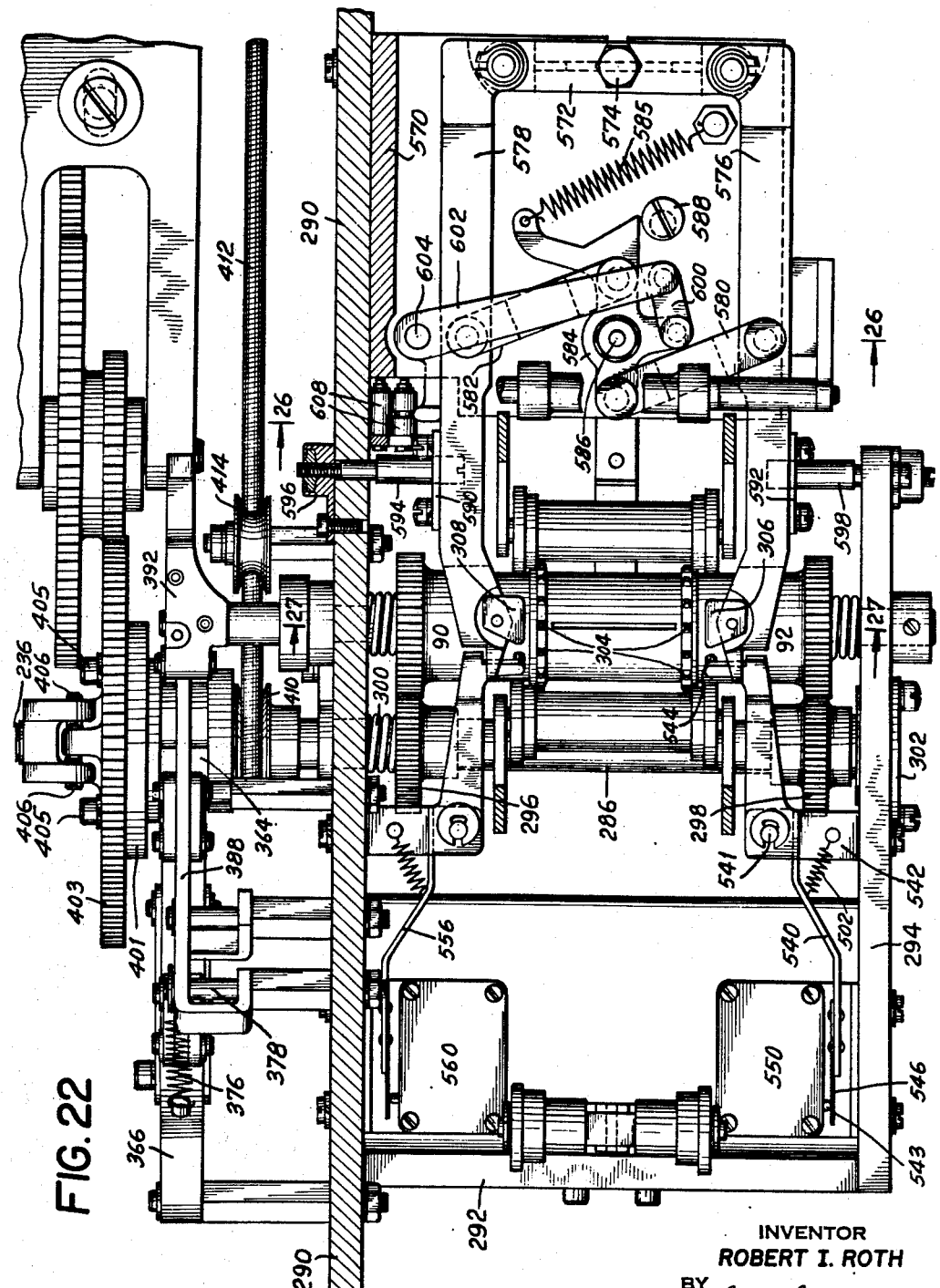

Dec. 21, 1954  R. I. ROTH  2,697,649
CARD TO FILM AND FILM TO CARD MACHINE
Filed April 19, 1949  26 Sheets-Sheet 15
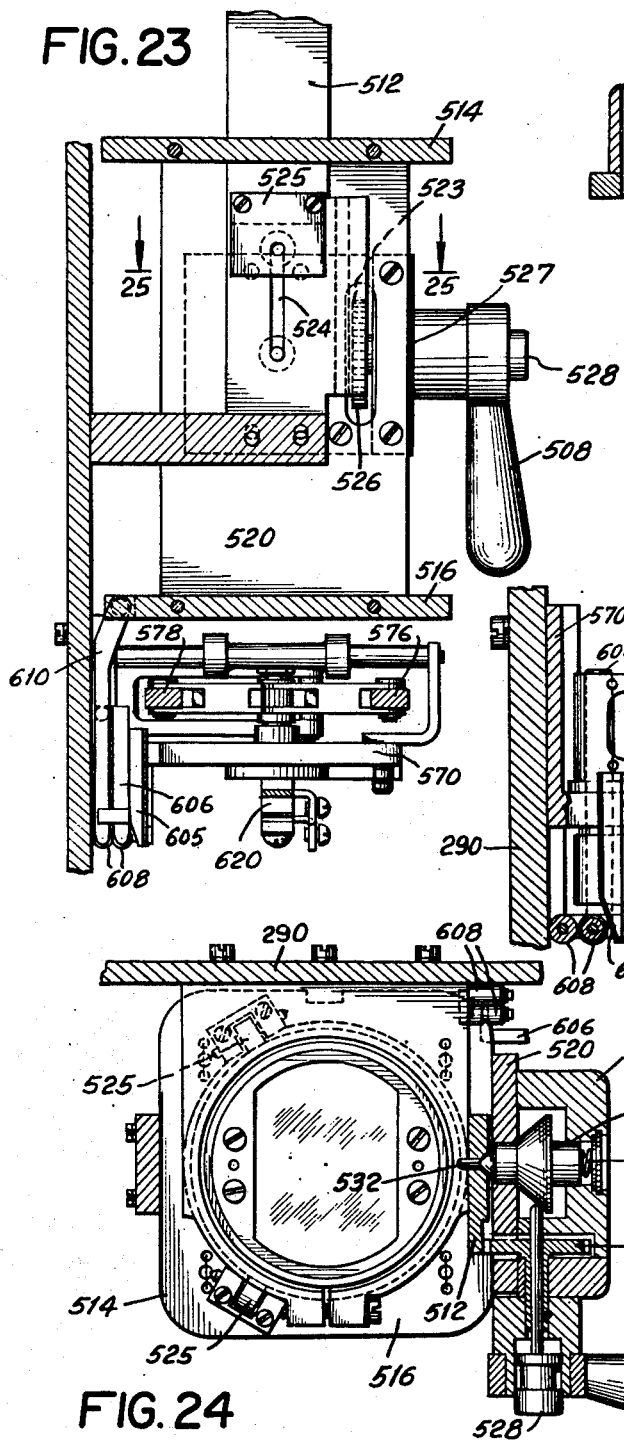
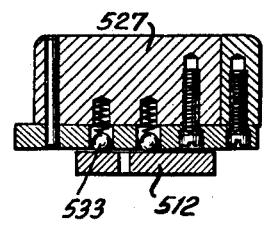
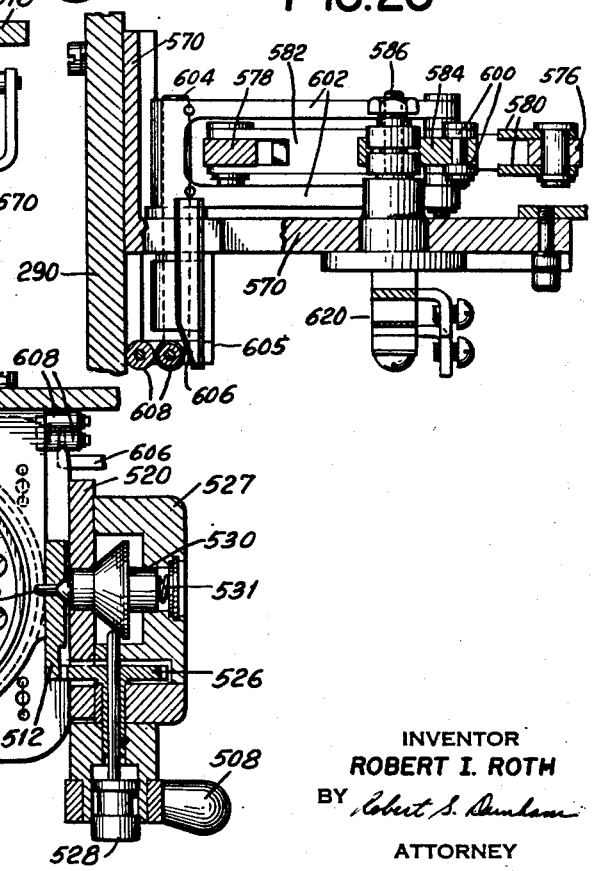
INVENTOR
ROBERT I. ROTH
BY Robert S. Dunham
ATTORNEY INVENTOR
ROBERT I. ROTH
BY Robert S. Dunham
ATTORNEY Dec. 21, 1954 R. I. ROTH 2,697,649
CARD TO FILM AND FILM TO CARD MACHINE
Filed April 19, 1949 26 Sheets-Sheet 17

INVENTOR
ROBERT I. ROTH
BY Robert S. Dunham
ATTORNEY

Dec. 21, 1954  R. I. ROTH  2,697,649
CARD TO FILM AND FILM TO CARD MACHINE
Filed April 19, 1949  26 Sheets-Sheet 19

INVENTOR.
ROBERT I. ROTH
BY Robert S. Dunham
ATTORNEY.

Dec. 21, 1954 — R. I. ROTH — 2,697,649
CARD TO FILM AND FILM TO CARD MACHINE
Filed April 19, 1949 — 26 Sheets-Sheet 20

INVENTOR.
ROBERT I. ROTH
BY Robert S. Dunham
ATTORNEY.

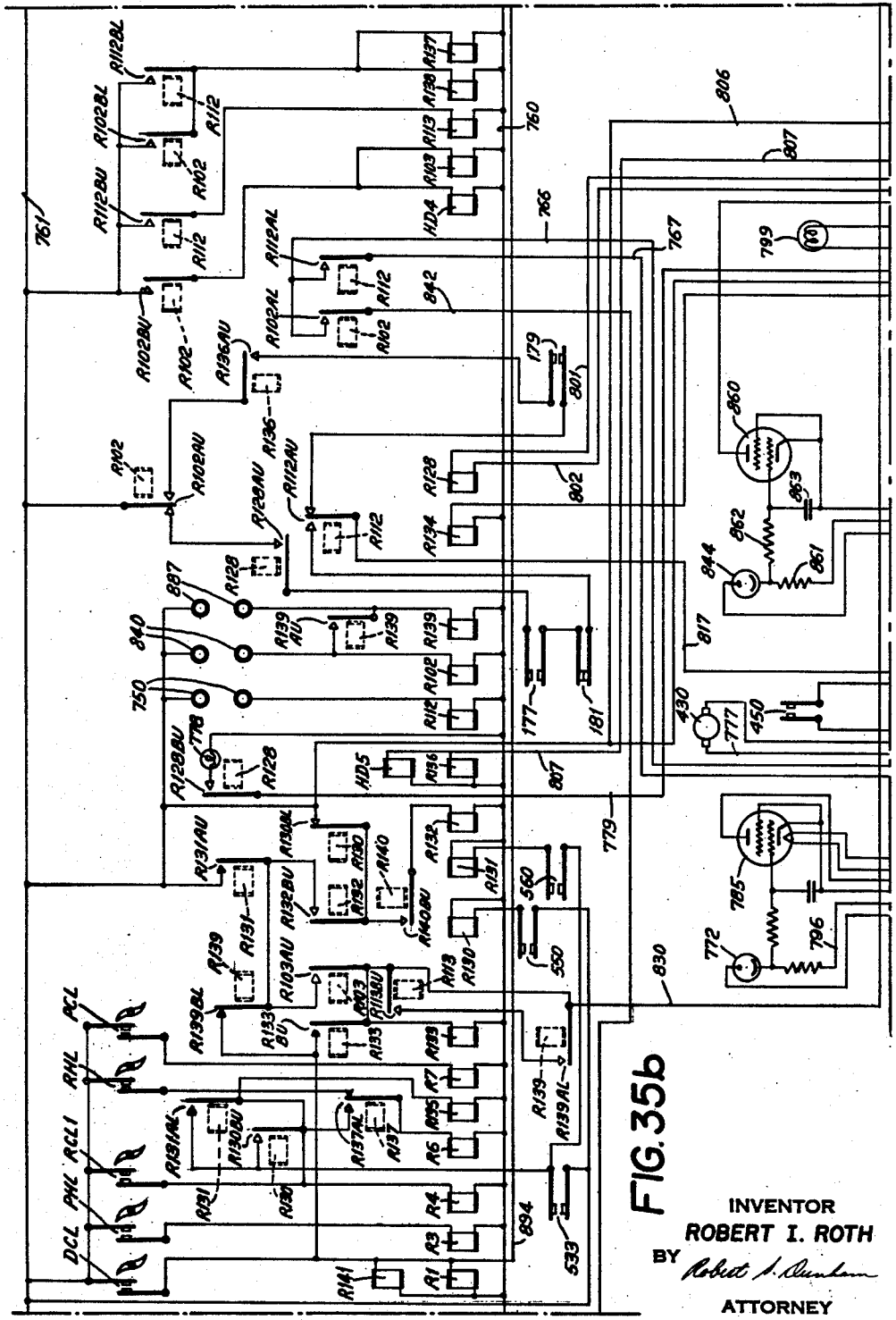

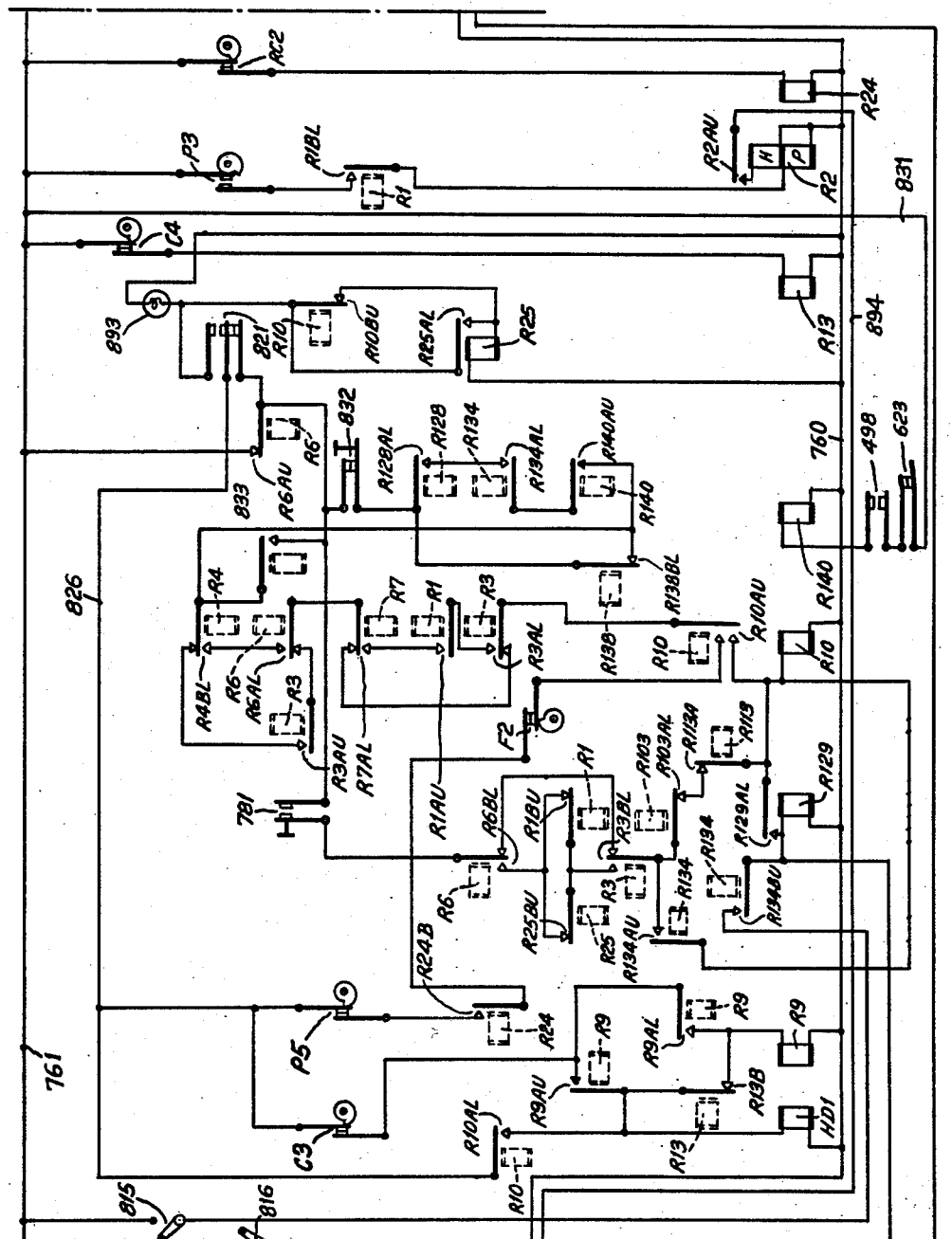

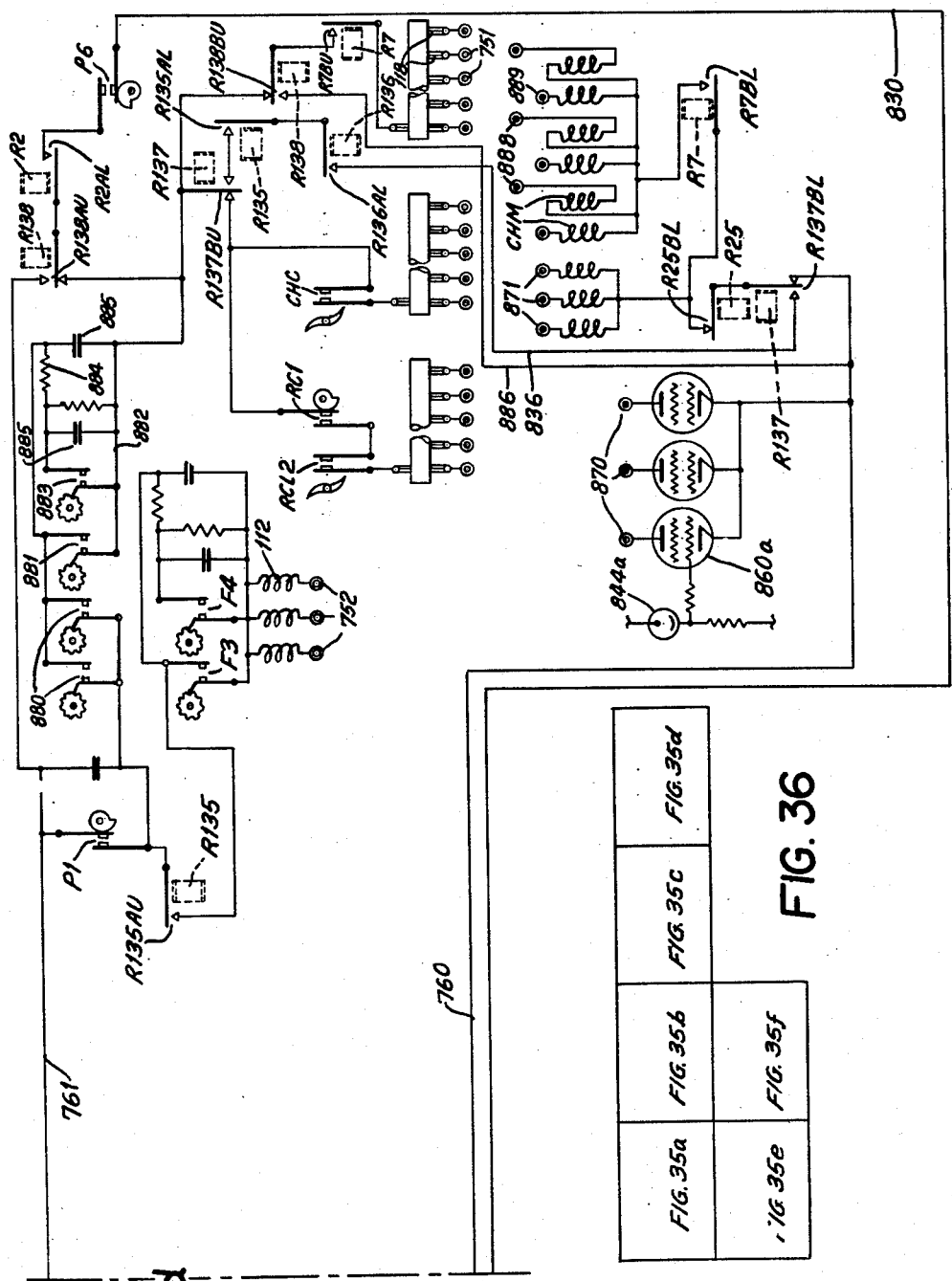

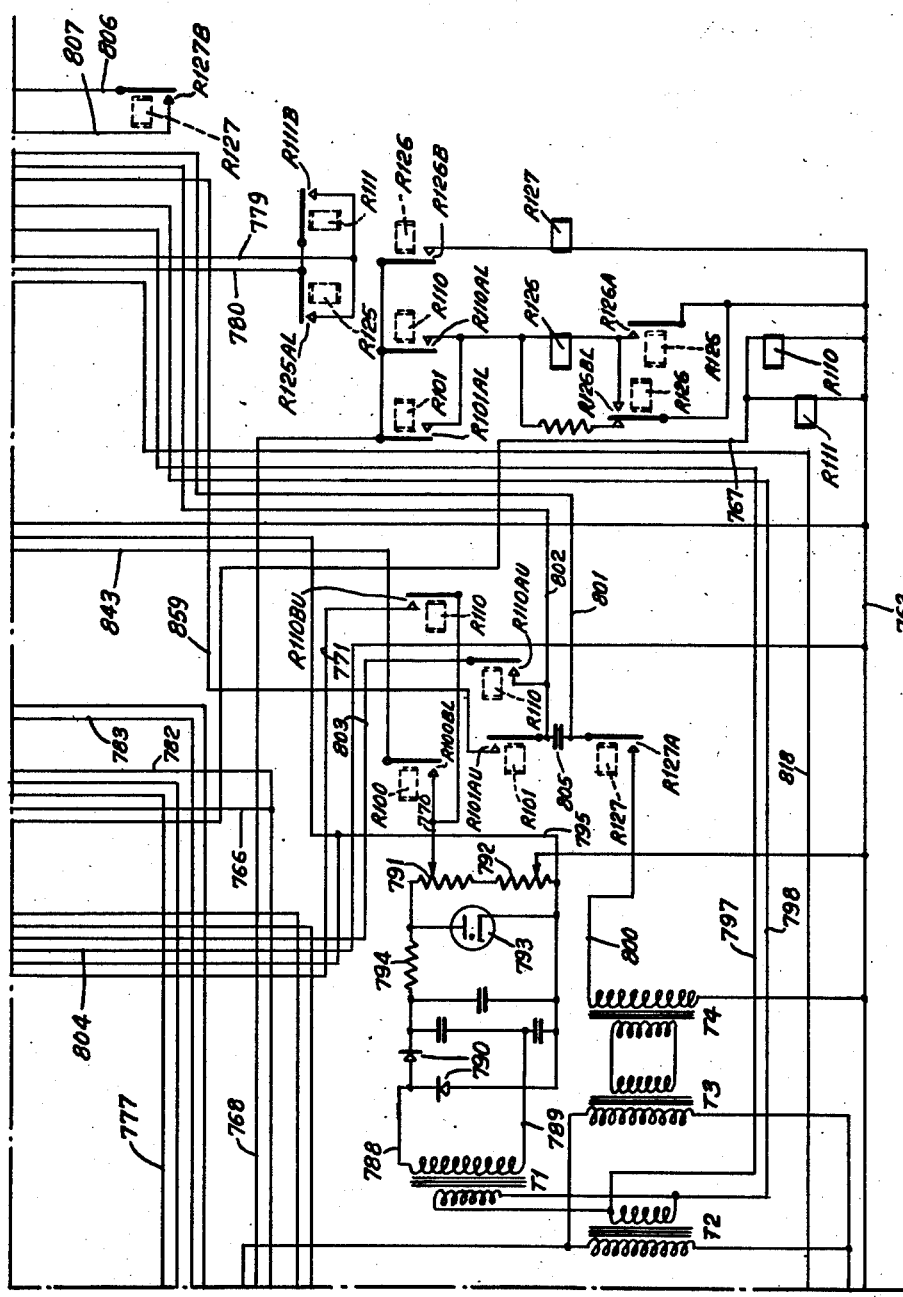

United States Patent Office 2,697,649
Patented Dec. 21, 1954

2,697,649

CARD TO FILM AND FILM TO CARD MACHINE

Robert I. Roth, Mount Pleasant, N. Y., assignor to International Business Machines Corporation, New York, N. Y., a corporation of New York Application April 19, 1949, Serial No. 88,452

32 Claims. (Cl. 346—107)

This invention pertains to perforated record cards and an object of the invention is to provide means for photographing representations of data derived from the punched cards, in miniature, upon rolls of photographic film which may be preserved, instead of the original bulky cards, thus saving storage space.

Another object is to provide improved means for using the film to produce duplicates of the original punched cards, should occasion require.

Further and other objects and advantages will be apparent from the specification and claims, and from the accompanying drawings which illustrate what is now considered to be a preferred embodiment of the invention.

Another object is to provide means so that a punched hole in a card will be represented on the film by a small transparent rectangle surrounded by a black background and to do this in a manner so that only a relatively simple development process will be required for the film. This development process is generally referred to as "developing to a negative."

Another object is to provide automatic means to distinguish an area on the film containing information from one tabulating card from adjacent areas containing information from other tabulating cards. The area on the film containing information from one tabulating card will be referred to as a "frame" and each frame is separated from the next by a transparent line extending across the width of the film.

Another object is to automatically produce upon the film a transparent line at one side of the film along its length. This line is used for control purposes.

Another object is to provide means so that developed film can be compared with the original cards used in photographing in order to detect errors in photographing or poor spots in the emulsion of the film.

Another object is to provide means so that additional cards can be reproduced from the developed film. All of the columns can be reproduced or part of them at will and columns can be re-arranged between the film and the reproduced cards.

Another object is to provide a machine which in addition to "card to film" or "film to card" operations can also be used for the usual "card to card" reproducing operations.

Another object is to provide visual means for checking the registration of the columns on the developed film and to provide an adjustment in the optical system to bring columns in correct relation with their associated light responsive elements.

Another object is to provide automatic centering means to center the film about the optical axis.

Another object is to provide a machine which requires relatively simple amplifying means between the light responsive elements and their associated control magnets.

In the drawings:

Fig. 1 is a view of a typical perforated tabulating card having 12 horizontal rows of positions with 80 positions in each row.

Fig. 2 shows portions of a raw film substantially full size, as prepared for photographing;

Fig. 3 shows a portion of a developed film, each black rectangle with its transparent spots corresponding to a particular tabulating card with its perforations;

Fig. 6 shows details of the fluorescent tube and shutter mechanism of Fig. 4;

Fig. 7 is a view of some features of Fig. 6, enlarged to more clearly show a detail of the shutter operating device;

Fig. 8 is an enlarged view of the light slit and a shutter of Fig. 6 with the shutter in its normal retracted position;

Fig. 9 is a diagrammatic illustration of the optical system for "comparing" or for "film to card" operation, showing the inclined mirrors with the three rows of photocells and their associated thyratrons;

Fig. 10 is a view on plane 10—10 of Fig. 9 showing diagrammatically how the fixed ray-reflecting inclined mirrors are interspersed between the light rays which go straight through to the bottom row of photocells;

Fig. 11 is a diagrammatic illustration of the machine with the shiftable mirror set for visual inspection of the film on a ground glass screen;

Fig. 12 is a front view of the machine, showing the optical cabinet at the left, with the camera mounted on top of it, and the perforating machine at the right. This view also indicates in broken lines the optical system within the cabinet in the "card to film" position of Fig. 4;

Figure 15:
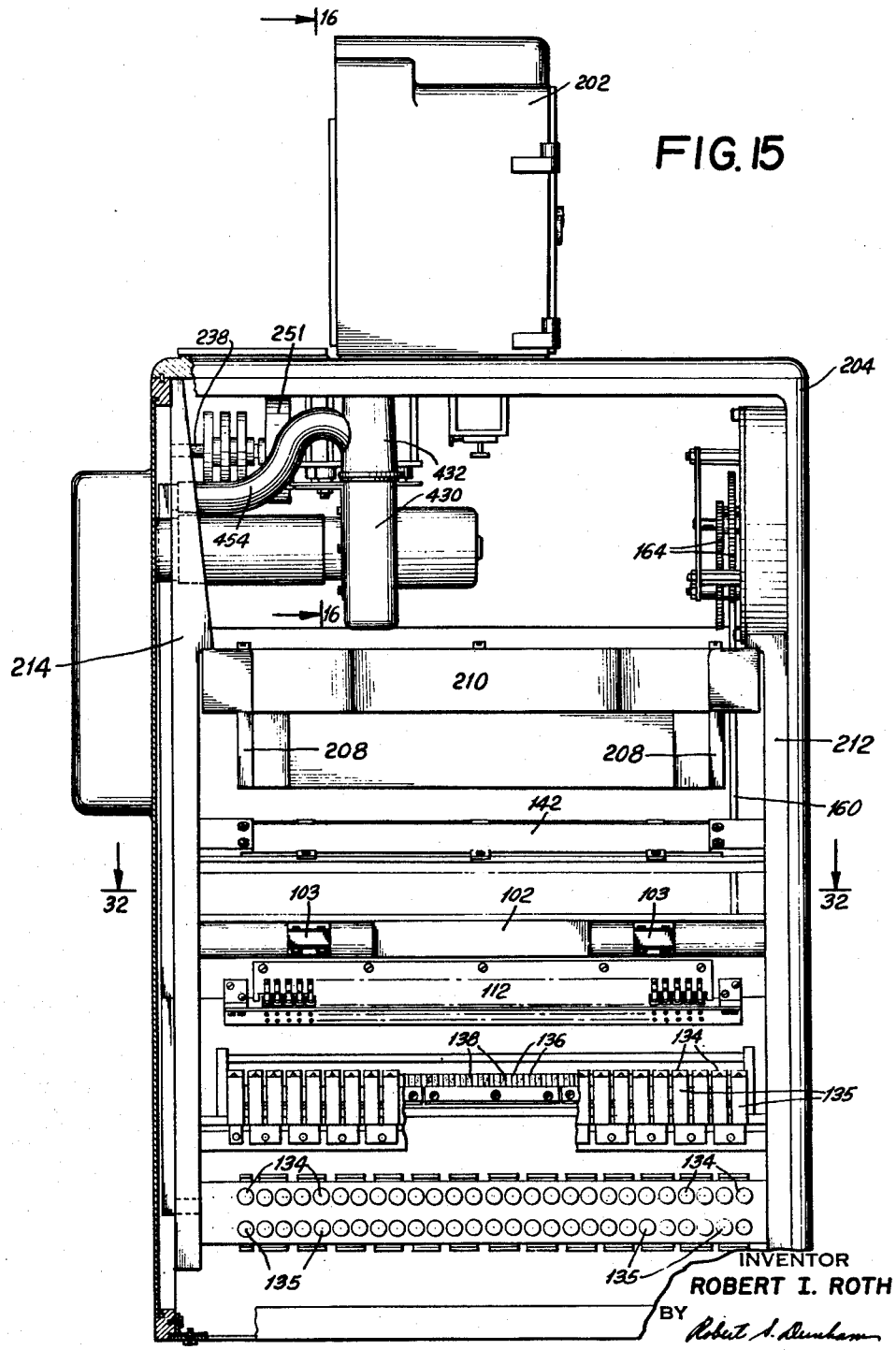
Figure 20:
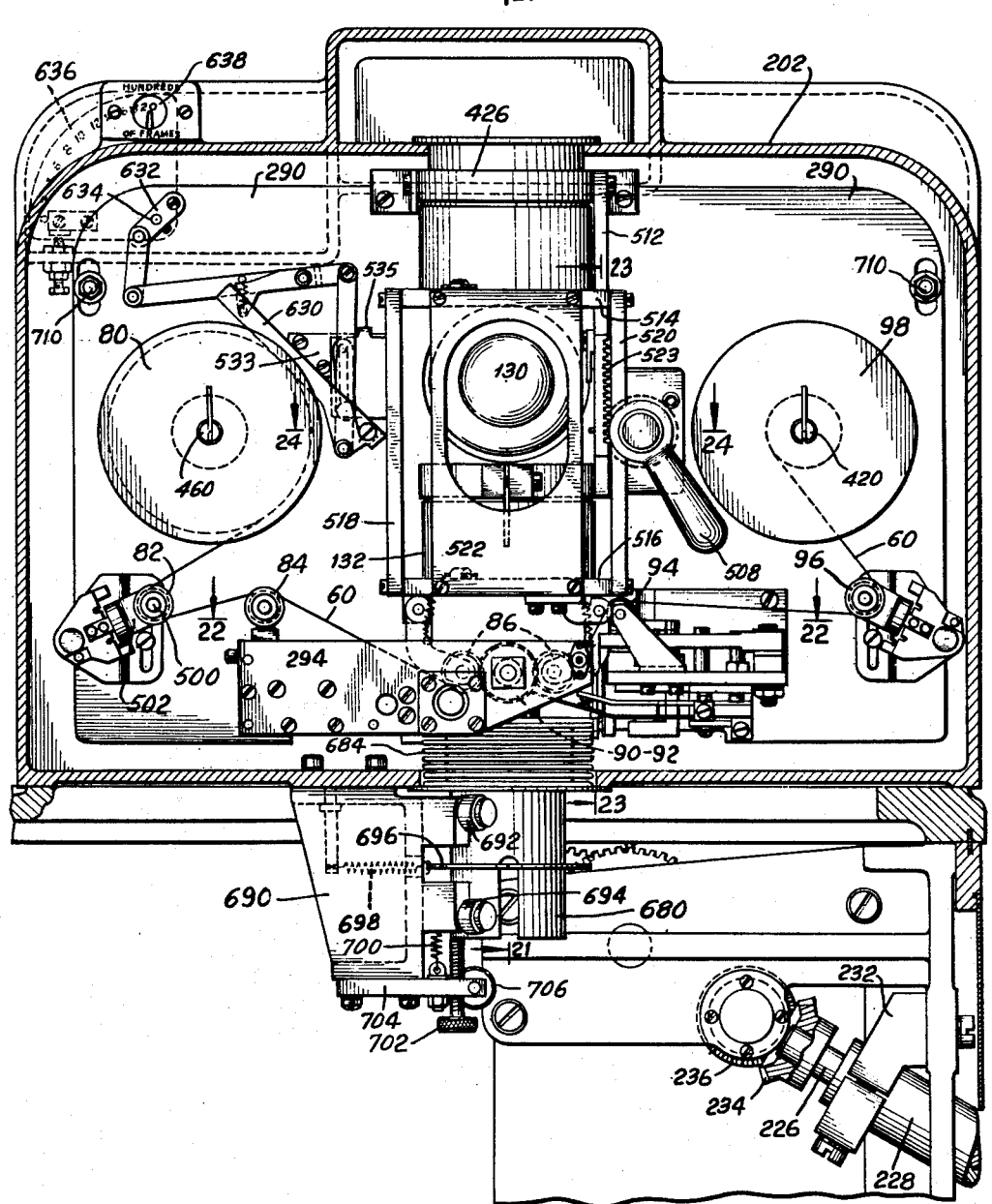
Figure 21:
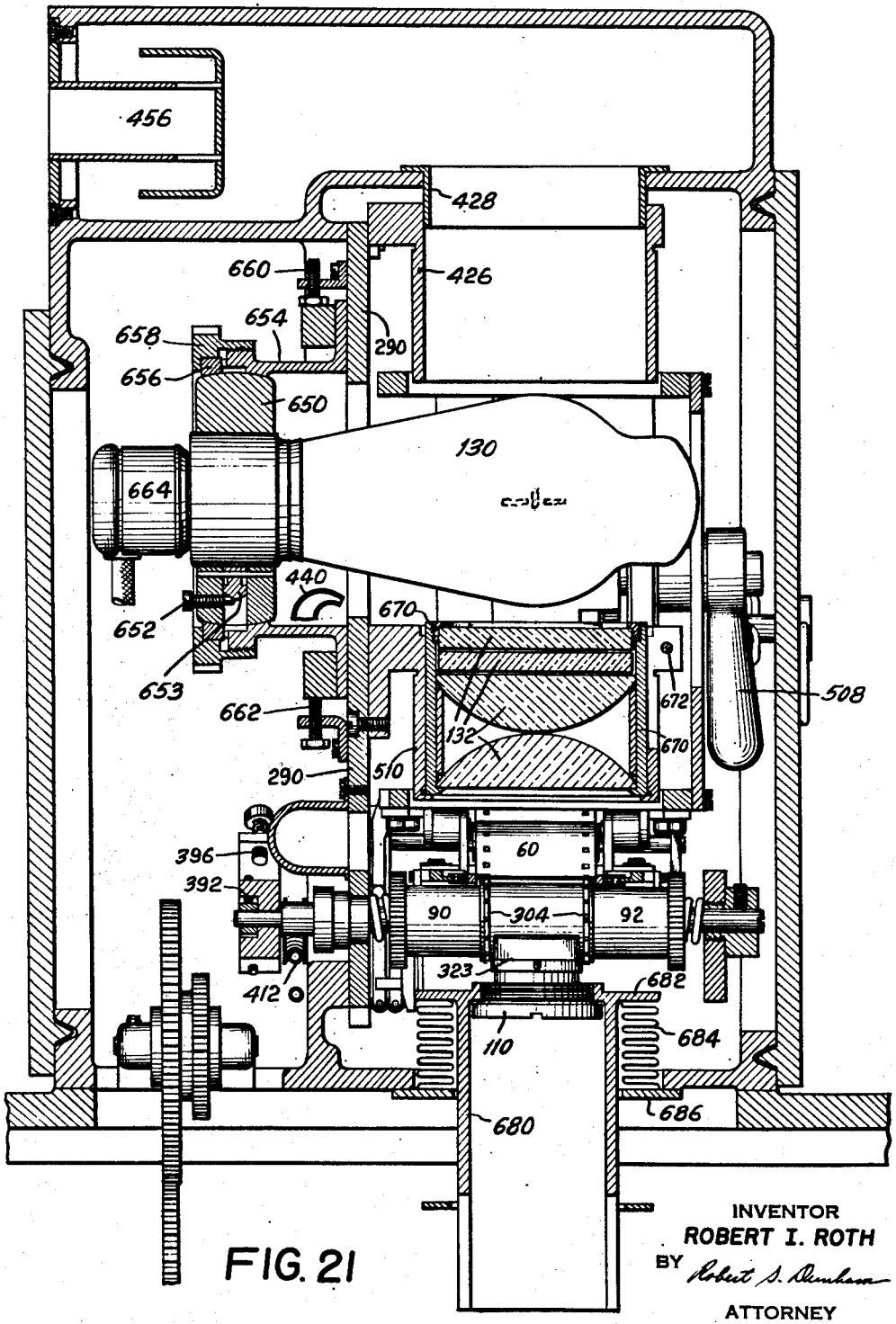
Figure 27:
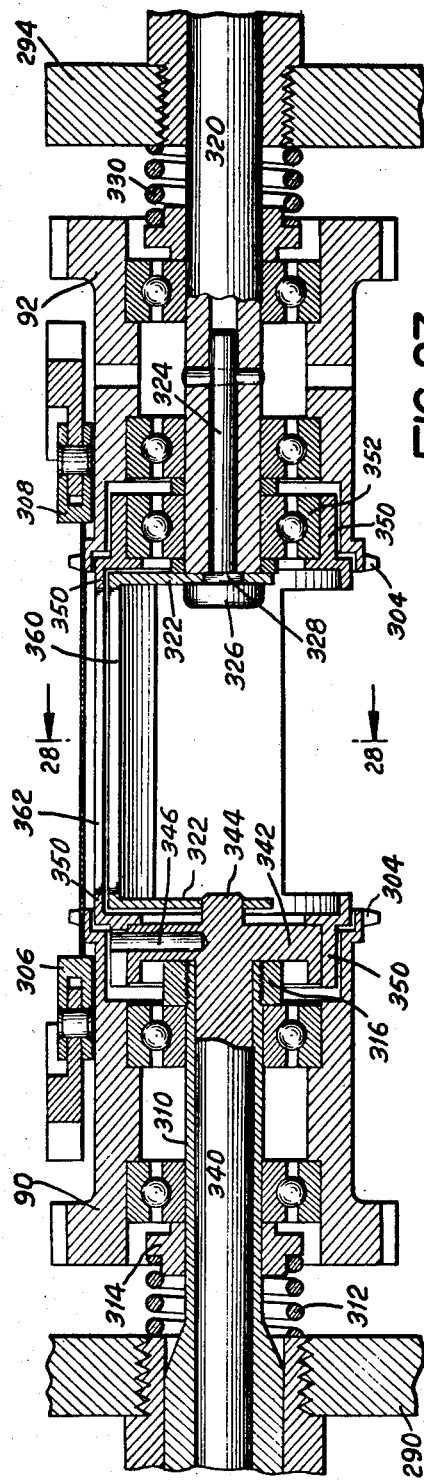
Figure 28:
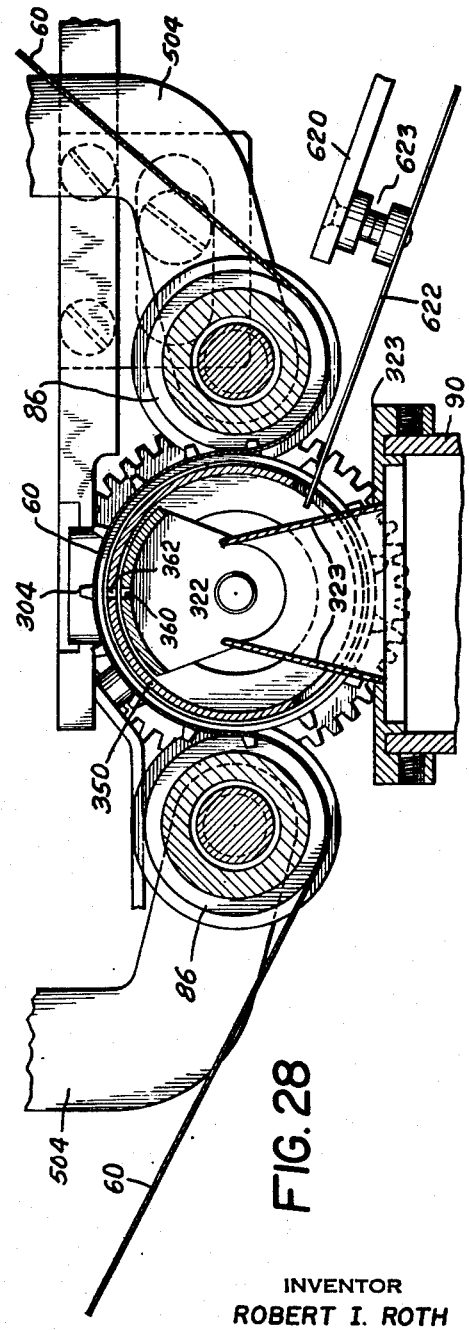
Figure 29:
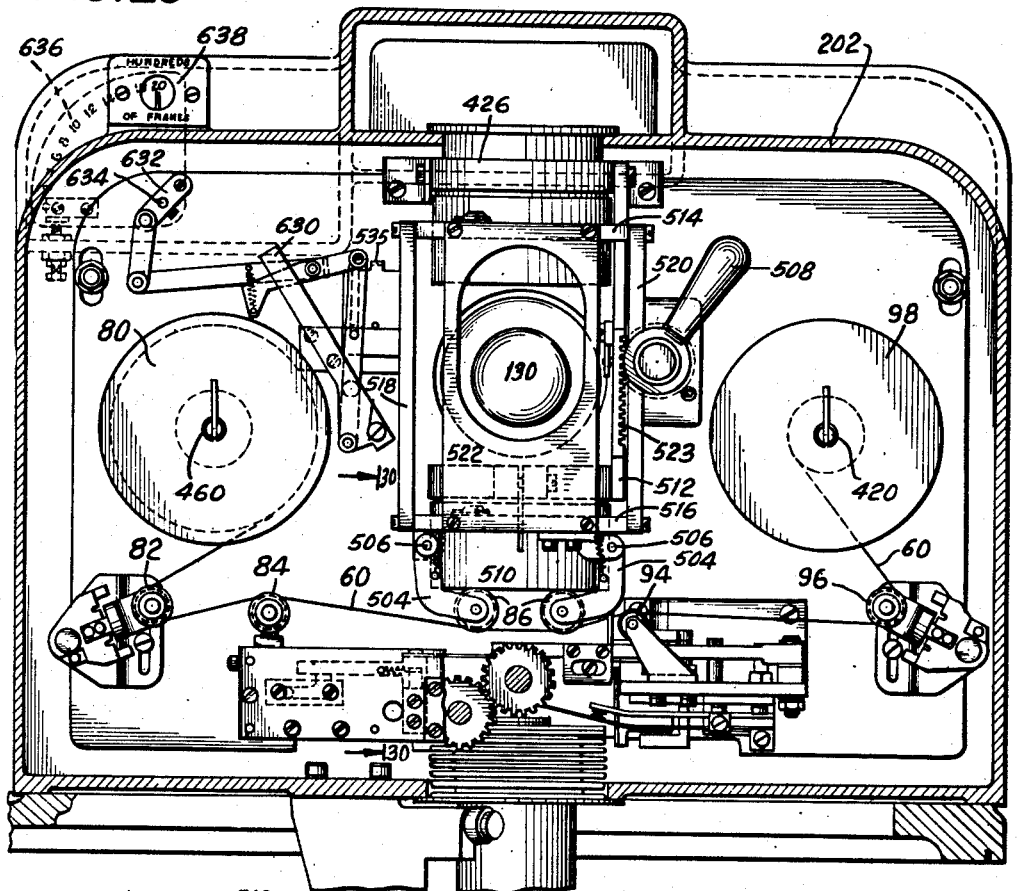
Figures 30, 31:
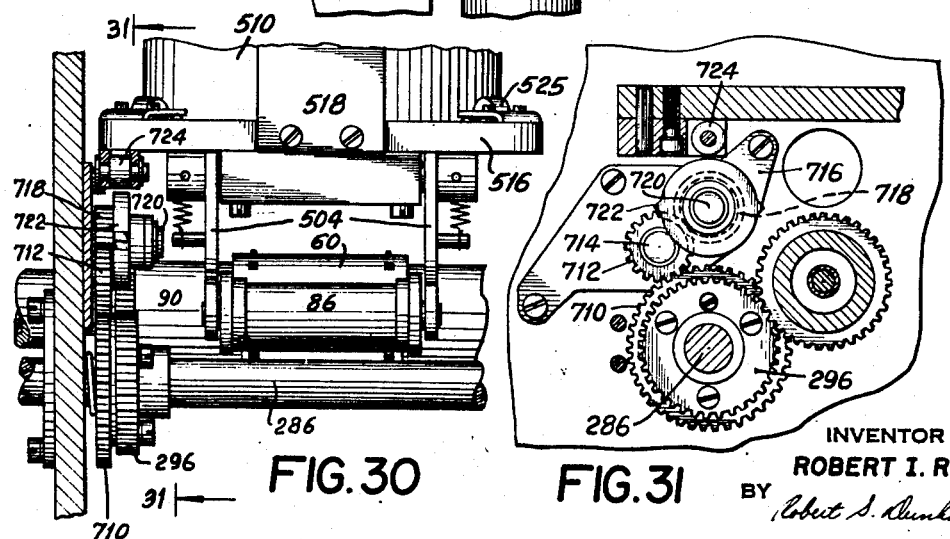
Figure 32:
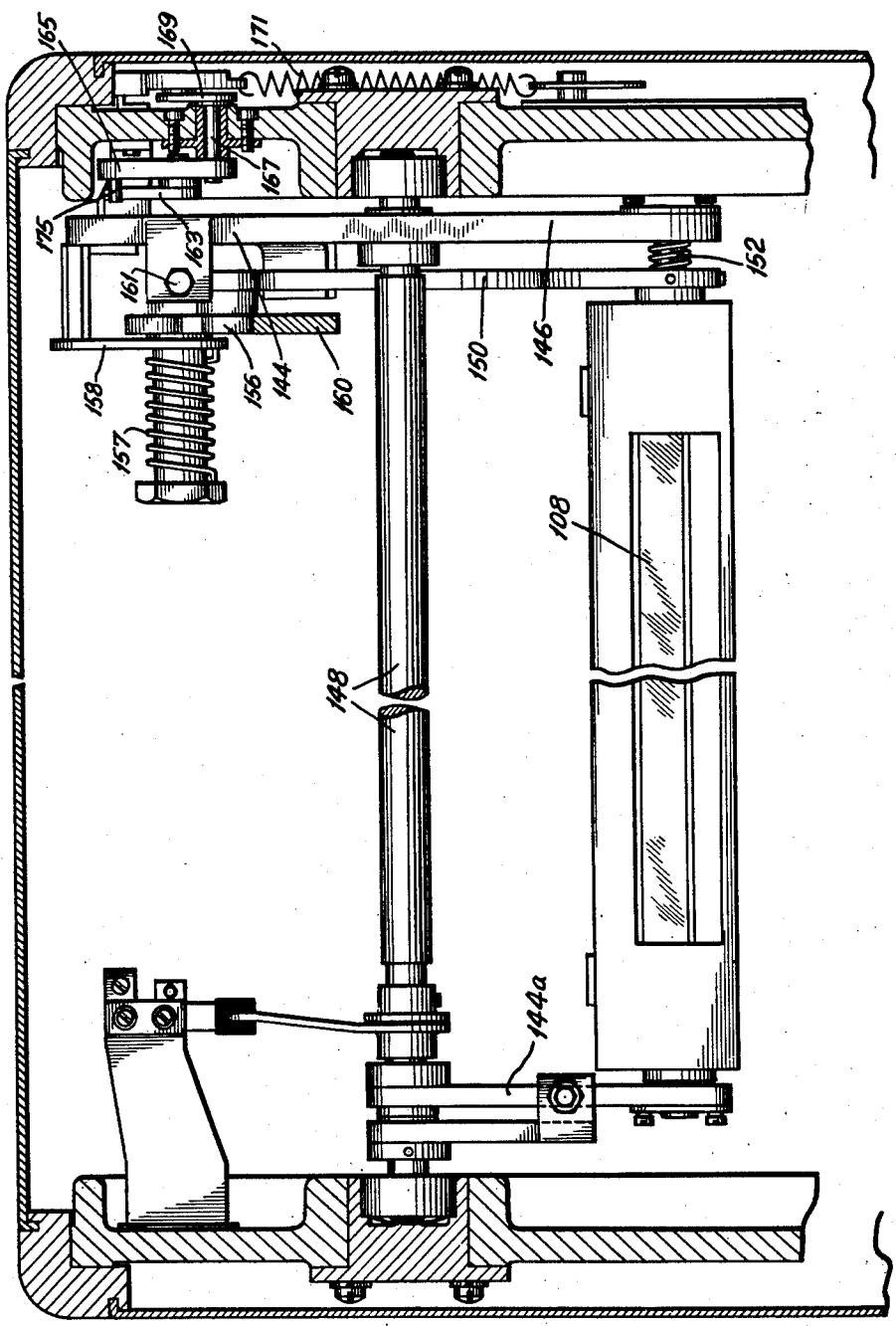
Figure 33:
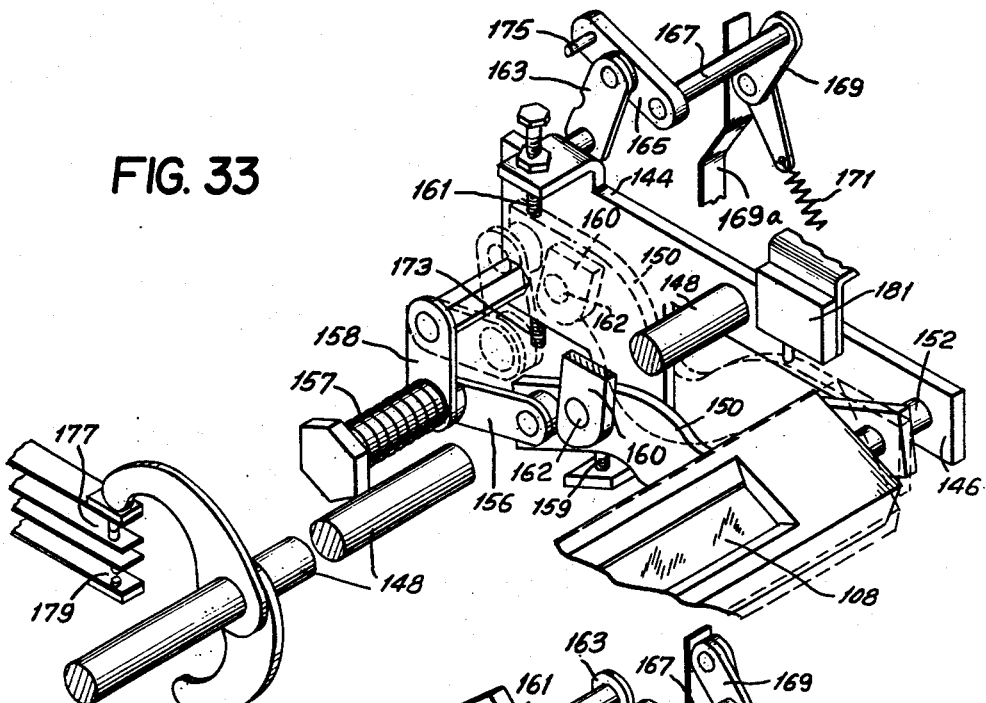
Figure 34:
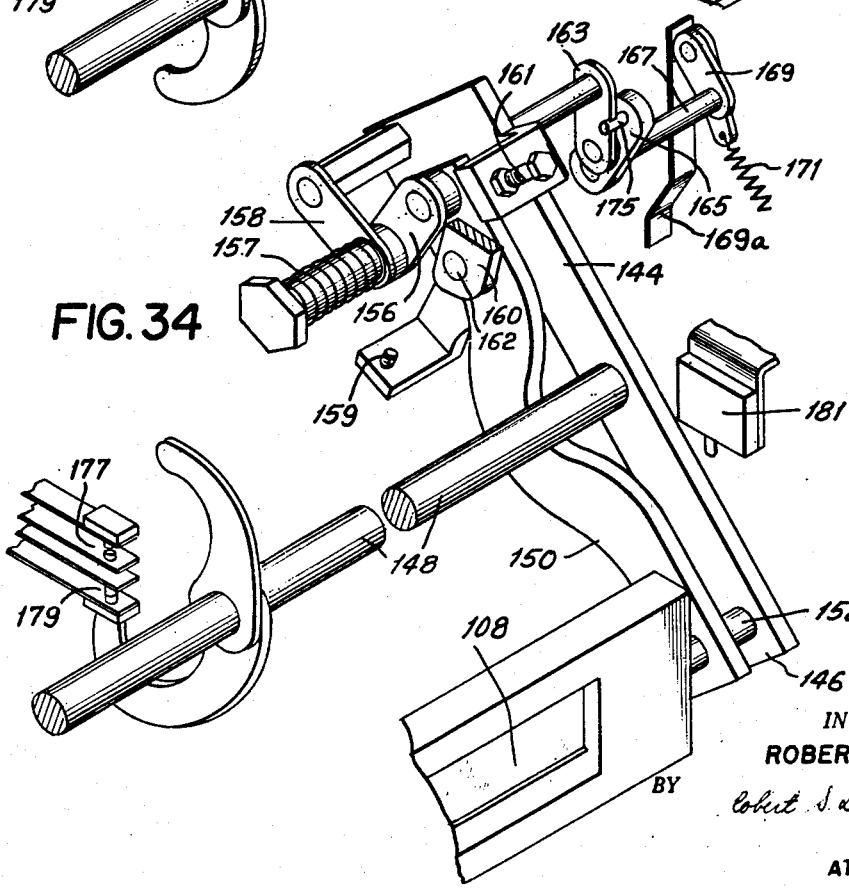
Figure 37:
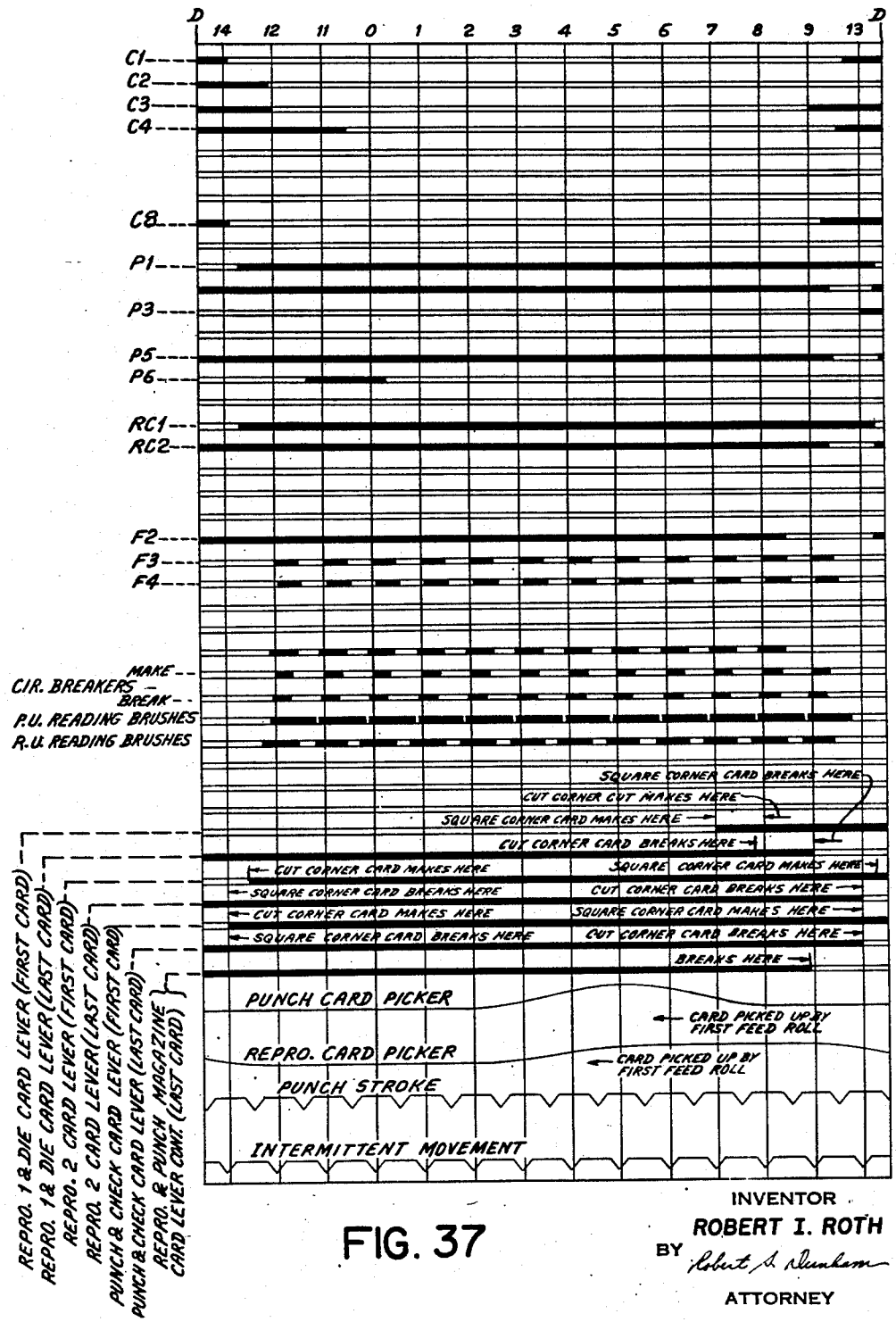

Fig. 13 is a copy of Fig. 3 of U. S. Patent No. 2,032,805 to Lake, the right half of which forms the perforating machine of Fig. 12;

Fig. 14 is a copy of Fig. 2 of Lake Patent No. 2,032,805, being a rear view of Fig. 13 (Lake, Fig. 3) but with the addition of an inclined shaft at the extreme right for driving the camera;

Fig. 15 is a view of the interior of the optical cabinet of Fig. 12, viewed from the left;

Fig. 16 is a view on line 16—16 of Fig. 15 showing the upper part of the optical cabinet and interior of camera and illustrating in addition, at the left, the drive taken through the inclined shaft at the right of Fig. 14;

Fig. 17 is a view of the cam shaft, with friction-driven fly-wheel in the upper left of the optical cabinet (Fig. 15), and operated by the inclined drive shaft of Fig. 16;

Fig. 17a is a detail sectional view taken on lines 17a—17a of Fig. 17 and shows the one-revolution camera clutch;

Fig. 18 is a view, partly in section, of the film supply reel located at the left in the camera unit (Fig. 20);

Fig. 19 is an enlarged view of the sprocket-shutter operating mechanism, which is also partly visible in the camera of Fig. 16;

Fig. 20 is a front view of the interior of the camera unit including the upper portion of the optical cabinet. In this view, the vertically-slidable film pressure roller support is shown in its lowered or operating position with the film wrapped around the sprockets;

Fig. 21 is a sectional view on line 21—21 of Fig. 20. This view shows in detail the optical elements of the camera unit;

Fig. 22 is an enlarged view on line 22—22 of Fig. 20, showing the film-handling mechanism;

Fig. 23 is a view on line 23—23 of Fig. 20. This view shows the handle and some of the parts of the sliding support. It also shows a section through the film centering mechanism;

Fig. 24 is a view on line 24—24 of Fig. 20. This shows in detail the operating handle and detent of the sliding support;

Fig. 25 is a view taken on line 25—25 of Fig. 23 and shows the spring pressed balls which position the sliding enclosure about its vertical axis;

Fig. 26 is a view on line 26—26 of Fig. 22. It shows in detail some parts of the film centering mechanism;

Fig. 27 is a view on line 27—27 of Fig. 22 showing the construction of the film sprocket and sprocket shutter with the addition of a film in position, and located by the guiding shoes;

Fig. 28 is a view on line 28—28 of Fig. 27 showing the construction of the sprocket shutter, also the pressure rollers holding the film on the sprocket, and the safety switch;

Fig. 29 is a front view of the camera similar to Fig. 20, but with the sliding support raised;

Fig. 30 is a view on line 30—30 of Fig. 29 showing the gearing and cam for periodically nudging the sliding support;

Fig. 31 is a view on line 31—31 of Fig. 30;

Fig. 32 is a cross sectional view taken along line 32—32 of Fig. 15 illustrating the movable mirror and associated positioning parts;

Fig. 33 is an isometric view of certain parts shown in Fig. 32. The view is taken looking in the general direction of the arrow on Fig. 32. The dotted position of certain parts shown in Fig. 33 corresponds to the position of parts as shown in Fig. 32;

Fig. 34 is a view similar to Fig. 33 but with the parts in a moved position;

Figs. 35a through 35f, taken together and arranged in the manner shown in Fig. 36, show the complete circuit diagram of the machine;

Fig. 36 is a diagrammatic view showing the interrelation of the sheets of the circuit diagram; and Fig. 37 is a timing diagram.

*Method of operation*

Before describing the machine in detail, the general mode of operation and the intended results to be obtained can be briefly referred to. It is sometimes desirable to obtain a record of data punched in tabulating cards for storage in very compact form. Punched cards can be sensed and the sensed data reproduced in compact form on photographic film. Thereafter it may be desired to reproduce a new set of tabulating cards from the film. As an incident to the foregoing general operations, it may be desired to check the accuracy of the film by comparing the film data against the punched data appearing on the original tabulating cards.

Machines now in general use and known as reproducers are adapted to feed blank cards and to punch them. The punching is usually effected under the control of another set of cards. Such reproducers are also provided with sensing brushes for comparing purposes. According to the present invention, a complete reproducer of the type now in general use is utilized for punching cards under film control in lieu of under card control, and such portion of the machine being provided with sensing brushes is utilized for preparing film on card to film operations and for comparing purposes to check developed film against original punched cards. The reproducer in question is shown in Lake Patent No. 2,030,805 and in the present case the punching section and the sensing section in the punching section only are utilized. The remaining section of the machine, namely, the advance reading and sensing sections of the machine, is not utilized on card to film or film to card operations but such section may be utilized for card to card operations if desired.

For "card to film" operations, the cards are sensed by brushes in the reproducer section of the machine while unexposed film is being simultaneously fed in the camera section of the machine. Normally open shutter devices are provided which allow light to reach the film. When a perforation is sensed in a card, the corresponding shutter is called into operation so light is prevented from reaching the film. In this way, upon development the film will show a transparent area at points which correspond to the sensed perforations on the card, with the remaining area in the related column opaque.

For "film to card" operations the developed film with its transparent spots or areas is fed through the camera section of the machine. In this case the film acts as a shutter and allows or shuts off the passage of light from a light source to photocells. The photocells when activated call into operation related punch magnets which are in the reproducer unit. These cause punching of a card in the punching section of the reproducer. Accordingly data on the film is converted into punched data on a card.

Provision is also made for comparing a film with a set of cards which should exactly correspond. If a lack of correspondence is detected between a particular film frame and its related card suitable controls are provided to stop machine operations and to designate the column where there is a discrepancy.

A length of film 60 prepared for photographing and provided with holes 56 for sprocket teeth, is shown in Fig. 2. For use the film is wound on a reel. The film has a leader 62 on its leading end and a trailer 64 on its trailing end. The leader and trailer must be black if the camera is to be loaded in daylight.

To place the film on its reel the end of trailer 64 is inserted in a slot in the core of the reel and the film is then wound upon the reel with the emulsion side of the film towards the center of the reel.

A "stop" notch 66 is cut in the edge of the raw film, between sprocket holes, about three feet from the film trailer end. A "start" notch 68 is cut about three feet from the leading end, also between sprocket holes.

There are three sprocket holes per frame and the holes are three-sixteenths of an inch center to center, therefore the stop and start notches 66 and 68 are a multiple of nine-sixteenths of an inch apart. A threading hole 70 is punched in leader 62 with the center distance between hole 70 and notch 68 a multiple of nine-sixteenths of an inch minus three-thirty-seconds of an inch.

Referring to Figs. 4, 5, 20 and 29 for "card to film" operation, the film 60 is on the supply reel 80. Its leader 62 is threaded around roller 82, over roller 84, under the left roller 86, over the sprocket halves 90—92, under the right roller 86, over roller 94, around roller 96 and onto the take-up reel 98. Preparatory to beginning operations the threading hole 70 in leader 62 (Fig. 2) is placed in line with the top tooth on sprocket 90—92. With machine stopped, there is always a tooth on the vertical axis.

In the optical cabinet (Figs. 4 and 5) at proper distance below the film, light from a long fluorescent lamp 100 in a horizontal tube 102 which is suitably supported at its ends and provided with terminal block 103, passes through a slit 104 (Figs. 6 and 8) formed by a pair of horizontal plates 105, to form a sheet of light 106 which travels horizontally until it is diverted to a vertical plane by mirror 108, to finally become imaged by camera lens 110 on film 60 at the top of sprockets 90—92.

Figure 5:
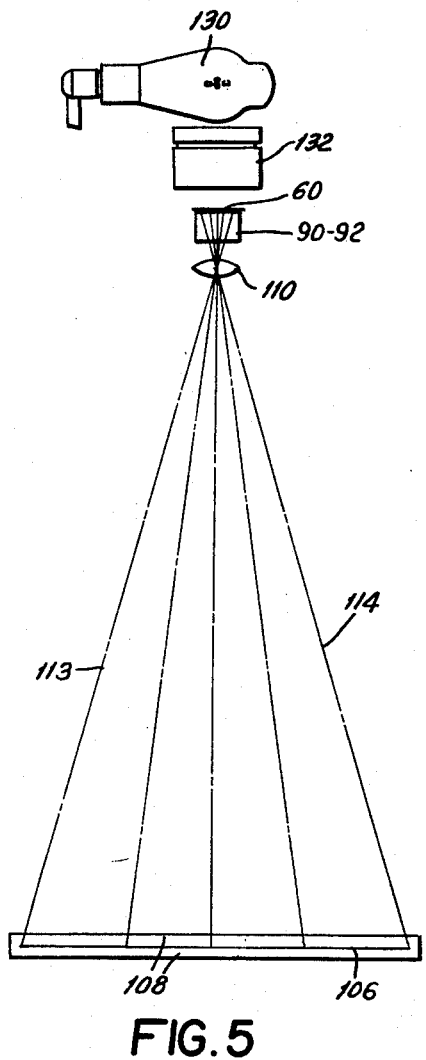
Fig. 5 is a view on line 5—5 of Fig. 4.

In Fig. 5 the edges of light sheet 106 are indicated at 113, 114. The image of slit 104 upon the film is only a few thousandths of an inch wide in the direction of film travel and its length is slightly less than the width of the film between the two rows of sprocket tooth perforations 56 (Fig. 2). The length of the film image is parallel to the axis of the sprocket. The optical reduction between slit 104 and the image on the film, through lens 110, is twenty to one. Thus the dimensions of the film image are one-twentieth the dimensions of slit 104.

Arranged in front of slit 104 is a row of 80 vertically-movable shutters 111, each controlled individually by an electromagnet 112 (Figs. 4, 6, 7 and 8). Normally the top ends of the shutters are below slit 104 as in Fig. 8 and do not obstruct the light.

There is also a shutter in the 81st card position, but the top of that shutter is permanently in front of slit 104 in order to produce the continuous unexposed transparent line 116 on the film (Fig. 3).

Cards to be simulated on the film are placed face down in the magazine P of the punching unit of the reproducer (Fig. 13), with the twelve position leading, and with the proper plug board 206 inserted. Upon depression of the start key, cards will be fed in the punching unit until the first card is in position to be read by the row of brushes 118 (Fig. 13). The feed of cards will then stop but the film will continue to feed with a uniform motion until the start notch 68 (Fig. 2) is sensed. After the start notch 68 is sensed, cards will be fed in synchronism with the film. The cards are fed with an intermittent motion under control of a Geneva mechanism, but the film always moves with a uniform motion.

A punched hole 120 (Fig. 1) in any column of a card causes a circuit to be completed, through a brush 118 (Fig. 13), to the shutter magnet 112 (Fig. 6) associated with that particular column, thus raising an armature 115 and causing the shutter 111 controlled by that magnet to rise against the tension of spring 122, thus preventing light from coming through the portion of the slit 104 obscured by the raised shutter and therefore leaving an unexposed, and therefore transparent, spot on the portion of film 60 then at the top of sprocket 90—92 (Figs. 4, 5) and finally, after all cards have passed, producing the film illustrated in Fig. 3, on which each black rectangle corresponds to a card of Fig. 1, with each transparent spot on the film representing a perforation 120 on the card.

The shutter is held in the raised position for one half the time required by the card in moving from one digit position to the next. The width of the spot on the film is determined by the width of the shutter, and the length of the spot is determined by the length of time the shutter magnet 112 is held energized. A hair-pin spring 124 holds each shutter 111 against its armature, thus preventing bouncing of the shutter.

Preferably the mirror 108 (Fig. 4) for "card to film" operations is so set that the light beams 106 which extend up to the lens 110 have a slight tilt to the right so as to impinge on the film 60 with a slight amount of what may be termed optical lead. This lead properly places the transparent spot representation at the proper point on the film for use with subsequent film to card operations. Expressed otherwise, the vertical beams 106 of Fig. 4 have a slight angular lead with respect to the vertical beams 142 of Fig. 9. The spot position is thus determined in part by the optical lead mentioned above and also by the time of initial energization of the shutter magnet.

Figure 4:
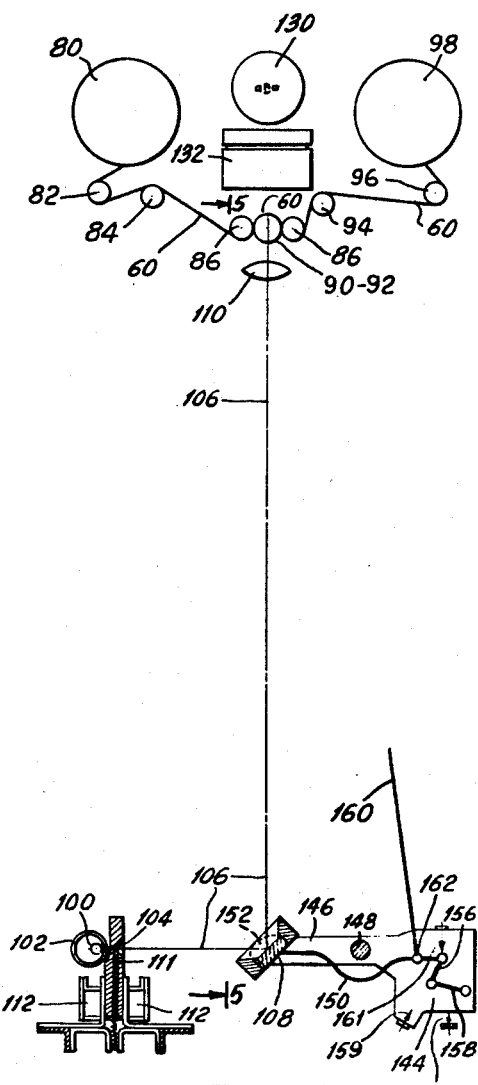
Fig. 4 is a diagrammatic illustration of the optical system adjusted for "card to film" operation, including an illustration of the mirror-shifting lever system.

Feeding of cards and film can now continue until the stop notch 66 is sensed (Figs. 2, 3). Sensing of the stop notch will stop the feeding of cards, but the film will continue to feed until the end of the film 64 (Fig. 2) leaves the supply reel 80 (Fig. 4). Feeding of film will then stop. The operator next depresses the start key which causes the film to be wound on the take-up reel 98 until the end of the trailer passes over sprocket 90—92. Feeding of film will then stop entirely even though the start key is still held depressed. The operator can then remove the film from the machine.

Leader 62 and trailer 64 can then be cut from the film and the film developed. After developing and drying, the film will have the appearance shown in Fig. 3. Each white spot on the film corresponds to a perforation 120 on a card (Fig. 1).

The transparent lines 126 between the frames are produced by a shutter mechanism between the sprocket halves 90 and 92 and will be described later.

The developed film can now be put back in the machine in order to compare it with the original cards. The film is always placed in the machine with the emulsion side down and the 80th column towards the rear. The proper plugboard 206 is inserted and the mirror 108 is moved to the out-of-commission position shown in Fig. 9. For this comparing operation, the fluorescent lamp 100 is not used, the projection lamp 130 being used instead. Light from lamp 130 is condensed on the film by lenses 132 (Figs. 9 and 10).

In the bottom of the optical cabinet are three rows of photocells 134. A thyratron 135 is associated with each photocell. There are 80 columns on the card. Referring to Figs. 9 and 10 the lowermost row of photocells 134 is at such a distance from the film that when the film is projected by means of the lamp 130 through lenses in tube 132, and by lens 110, the 80 card columns would be imaged only one-quarter of an inch apart on a horizontal plane through the cathodes of the photocells.

The photocells best suited for this work are so large that they must be mounted on at least three-quarter inch centers. If there were only 27 card columns, that lowermost row of photocells would take care of them all.

But, since there are 80 photocells and since they must be mounted on three-quarter inch centers and the columns on the film are imaged on one-quarter inch centers, the lower row of photocells 134 can accommodate only twenty-seven columns.

To take care of the other columns, rows of small individual mirrors 136 and 138 are set at forty-five degree angles into a stationary frame 140 extending parallel to the row of cells, and each mirror reflects a light ray 142 horizontally (Fig. 9) to a particular photocell 134, in right hand and left hand rows of photocells. Briefly, each film column has a particular photocell assigned to it, and any ray of light coming through a transparent spot in that film column will, at the proper instant, strike the photocell for that particular column. If that particular photocell is in one of the rows of cells at the right or left, the ray will be directed to its proper photocell by reflection to right or left from its individual mirror 136 or 138, but if the proper photocell is in the bottom row it will be reached by an undiverted ray passing straight down between the mirrors through the space provided for that purpose.

Fig. 10 is a sketch on plane 10—10 of Fig. 9 showing diagrammatically how the mirrors 136 and 138 are interspersed between the rays going straight through to the bottom row of photocells.

For the comparing operation the developed film is threaded around the 90—92 sprocket so that a transparent cross line 126 (Fig. 3) in the film, ahead of start notch 68, is in line with the topmost tooth of sprocket 90—92. The start notch should then be to the left of the sprocket and about 4 or 5 frames away from it. Depression of the start key will cause cards to feed up to the brush station (Fig. 13) where they will wait until the start notch 68 is sensed, after which cards and film will feed in synchronism. Errors will be indicated by the tripping of levers in the comparing unit and by the lighting of a red light. If no errors are found, the cards can be destroyed and the film stored away as a record.

If it be desired at some future date to reproduce cards from the film, that can be done by the arrangement of parts shown in Fig. 9. For this type of operation the thyratrons are plugged to the punch magnets of the reproducer. The film is put into the machine in the manner described above for comparing, and blank cards are placed in the magazine P of the reproducer punching unit. Upon depression of the start key, cards will be fed to the die station where they will wait until the start notch 68 is sensed. When that happens, cards and film will be fed in synchronism and the data on the film will be punched in the cards.

An important feature of the machine is the provision for visual inspection of the registration of the columns on the film. For such inspection the machine is for either "film to card" or "compare" and mirror 108 is shifted to the position shown in Fig. 11. In this position the film 60, passing over sprocket 90—92, can be projected for visual inspection on a ground glass screen 142 (Figs. 12, 15). Lines are scribed on the screen representing the 1st, 80th and 81st columns. If the columns on the film agree with those lines on the ground glass they will also agree with the photocells. Lens 110 can be conveniently moved up or down to bring the columns into correct registration.

*Mirror shifting device*

Referring to Figs. 4, 9 and 11, plate 144 with its leftwardly extending arm 146 is fastened on horizontal shaft 148 which is suitably journalled in the machine. Mirror 108 is fast on the end of a link 150, the left end of which is pivoted at 152 for angular movement on arm 146. The right end of link 150 is connected to plate 144, through links 156 and 158. An upwardly extending link 160 is pivotally connected to link 150 at 162.

Rod 160 is provided at its upper end with a rack which engages a gear train 164 in the upper part of the optical cabinet (Figs. 12, 15). The operator by means of lever 166 on the front of the cabinet can actuate gearing 164 to move rod 160 vertically, thereby shifting the mirror to any of its three operative positions, (1) SCR (Screen, Fig. 11); (2) CF (Card to Film, Fig. 4); (3) FC (Film to Card, Fig. 9). A pointer 168 indicates the setting, which, as illustrated, shows that the machine is set for "card to film" operation.

The parts for shifting the mirror, which have been explained above, also cooperate with supplemental parts which retain the mirror in selected shifted positions. These will now be described. Referring to Figs. 32 to 34 inclusive, a torsion spring 157 is so connected that it tends to force the two links 158 and 156 apart to the full line or dotted line positions shown in Fig. 33. In the full line position it holds link 150 against an adjustable stop 159. When in the dotted line position link 150 is held against an adjustable stop screw 161. As explained above, it is the up and down movement of link 160 which brings the link 150 to either the full line or dotted line position. The dotted line position is the card to film position of mirror 108 while the full line position is screen position.

Pivotally connected to plate 144 is a link 163 which in turn is pivoted to the center of a rock lever 165 which is fastened to shaft 167 journalled in the side front of the machine. A crank 169 is fast to this shaft and in turn is connected through a spring anchor to a tension spring 171. It is the force of spring 171 acting through the linkage described which holds the plate 144 against adjustable stop screw 173.

Fig. 34 shows the position of the parts in the film to card mirror position. The parts are moved from the dotted line position (Fig. 33) to the full line position (Fig. 34) by raising link 160 to a further extent. Abutment of link 150 against stop screw 161 causes plate 144 and shaft 148 to rock clockwise. Link 163 is moved upwardly causing an initial clockwise rotation of rock lever 165, shaft 167 and crank 169 and subsequent counterclockwise rotation of shaft 167 until pin 175 engages the notch in link 163. During this action the spring 171 is stressed and at the end of the action it holds pin 175 against the notch and thus holds the mirror 180 in the film to card position. A flat spring 169a presses against 169 and supplements the force of spring 171 when the parts are in the full or dotted line positions shown in Fig. 33.

Referring to Fig. 32 the shaft 148 has a short lever 144a attached to it for aiding in support of the mirror 108.

Shaft 148 has attached to it suitable crank arms for actuating contacts 177 and 179. As shown in Fig. 33 contacts 177 are closed and 179 open, whereas, in the Fig. 34 position the contacts 177 are open and contacts 179 are closed.

A microswitch 181 is provided and adapted for actuation by lever 150. The microswitch is open in the full line position of Fig. 33 and closed in the dotted line position. It is also open in Fig. 34.

Contacts 177, 179 and switch 181 which are controlled by the mirror shifting mechanism are used to prevent machine operation if the mirror should, at the start of operations, be in a wrong position. For example, when the machine is intended to perform "card to film" operations, contacts 177 and switch 181 must both be closed and contacts 179 must be open. These contacts control circuits in a manner which will be explained later in connection with the circuit diagram to permit machine operation. If the mirror should be tilted to the "screen position," switch 181 will be open and prevent machine operation. If the machine is conditioned for "film to card" operations, the mirror must be in the position shown in Fig. 34 and in this position contacts 179 will be closed and contacts 177 and switch 181 will be open.

Fig. 12 is a front view of the machine with the reproducer designated 200, the camera 202, the optical cabinet 204 and the plug board 206.

The reproducer is a standard card sensing and punching machine as disclosed in Lake Patent No. 2,032,805, Figs. 3 and 2 of which are reproduced herewith as Figs. 13 and 14, respectively.

Parallel flat steel bars 208 on front and rear of the reproducer extend into, and support, the optical cabinet, which in turn supports the camera (Figs. 12 and 15).

As shown in Fig. 15 bars 208 within the optical cabinet support a casting 210, which serves to carry the entire cabinet by means of a framework comprising front members 212, rear members 214 and member 216 at the left in Fig. 16. The entire cabinet is enclosed in light-tight removable covers.

Camera drive

Referring to Figs. 14 and 16, power for the camera is taken from shaft 220 of the reproducer. That shaft runs continuously.

On shaft 220 is a bevel gear 222 driving its mate 224 which is fast on a shaft 226 running on ball bearings within tube 228. That tube, at its lower end, is attached to the reproducer by clamp 230, and at its upper end is supported on wall 216 of the optical cabinet by a bracket 232.

On the upper end of shaft 226 (Figs. 16 and 17) is a miter gear 234 driving its mate 236 which is free to rotate on shaft 238 at the same R. P. M. as shaft 220 of the reproducer (Fig. 16).

Referring to Fig. 17, shaft 238 is supported at both ends by ball bearings. At its right end, the outer race of the bearing is held in an outwardly extending bracket 240 attached to frame 216 (see also Fig. 16). The bearing at the left end of shaft 238 is held in a plate 242 attached by screws to frame 214. At the right end of shaft 238, the inner race of the bearing bears against the hub of a spur gear 244 keyed to shaft 238. The other end of gear 244 bears against the inner race of one of the ball bearings inside bevel gear 236 and the inner race of this bearing in turn bears against the spring clip 246. The bearing spring 248 exerts a force between the outer race of the ball bearing and the bearing cap. This force is transmitted through the adjacent members to the spring clip 246 fast on shaft 238, thus holding the shaft against the ball bearing at its left end which is prevented from moving by the retaining plate 250. In this manner the parts just described are located axially on the shaft 22.

The removable plate 242 is provided so that F cams F-2, F-3 and F-4 can be easily replaced. These are the customary cams for operating cam contacts.

Mounted on shaft 238 (Fig. 17) is a flywheel 251 driven through friction discs 252 set into its hub. A friction collar in the form of a disc 254 is fixed on the shaft by a set screw 256, and a companion disc 258 on the other side of the flywheel is pressed axially by coil spring 260. Disc 258 is guided axially by rods 262, therefore the flywheel is driven only by the friction between its discs 252 and the spring-pressed discs 254 and 258, and is therefore free to rotate slightly, under impact, with reference to shaft 238.

In Fig. 17 the cap 270 has rigidly fastened to it the notched member 272 of the well known single-revolution type of clutch as described in Bryce Patent No. 2,302,002. Energization of the clutch magnet will release the usual clutch dog which will cause rotation of shaft 238, idler gear 276 (Fig. 16), and, through it, gear 278 on stud 280. Gear 278 carries on its hub a pinion 282, driving gear 284, fast on shaft 286, which is the drive shaft of the camera mechanism, mounted on camera supporting plate 290, within the camera case 202 (Fig. 16).

A suitable anti-backup device (not shown) is provided to backward rotation of gear 276. The devices are well known in the art.

Referring now to Fig. 22, plate 290 has mounted on it, and extending from it at left, the angle bracket 292 upon the outer end of which is a plate 294 parallel to 290. (See also Figs. 20, 29.) Shaft 286 is mounted on ball bearings in plates 290 and 294. Fast on shaft 286 are gears 296 and 298. Spring 300 holds the hub of gear 298 against the inner race of a ball bearing, the outer race of which is held against movement by cap 302, thus locating shaft 286 axially. Gears 296 and 298 drive sprocket halves 90—92. The sprocket halves are in axial alignment and in effect they act as a single sprocket in the operation of driving the film. Each half sprocket has a set of teeth 304 (Fig. 22) adapted to enter holes 56 in the film (Fig. 2), with sprocket half 90 at one side and sprocket half 92 at the other side of film 60. This arrangement permits driving both sides of the film while avoiding any improper interference with the light rays passing through the optical area of the film, between the sprockets. Shoes 306 and 308 (Figs. 22, 27, 28, 31) bearing against the edges of the film serve to guide the film with relation to the drive sprockets.

Shutter mechanism

Referring to Fig. 27, sprocket half 90 is supported on the outer races of two ball bearings, the inner races of which are slidable on hub 310 which is anchored in plate 290. Spring 312, through a collar 314, keeps the bearings under slight thrust towards a nut 316 on the end of hub 310, thus causing sprocket half 90 to rotate without end play.

Sprocket half 92 is supported on a stud 320 fast in plate 294. Stud 320, at its left end (Fig. 27) supports one end of the stationary sprocket shutter 322 which is attached to the left end of stud 320 by a pin 324 having a head 326 with a square shoulder 328 fitted into a square hole in the right wing of shutter 322. Pin 324 is held by a taper pin in a bored hole in stud 320. Spring 330, reacting against plate 294, exerts an axial pressure on shutter 322.

Referring now to the left side of Fig. 27, shaft 340 is rotatable in sleeve 310 and has on its right end an integral disc 342 with a small axially extending boss 344 which supports the left wing of shutter 322. Disc 342 acts as a support for another shutter 350, and through pin 346 serves to drive that shutter, which has a slot engaging the upper end of the pin. The right end of shutter 350 is supported by the outer rim of a ball bearing 352 on stud 320. It is apparent from the above that rotation of shaft 340 will rotate shutter 350.

Referring to Fig. 28, stationary shutter 322 has a narrow lengthwise slot 360, and the movable shutter 350 has a narrow lengthwise slot 362. These slots are shown in register in the vertical central plane, and in this position light can pass upwardly through the shutters and strike film 60, when photographing, or light can be projected downwardly through the film and shutters when film is being read. Near the "D" position, namely the home position, every cycle, shaft 340 and shutter 350 rotate clockwise an amount needed to move slot 362 out of register with slot 360 and thus close the shutter. Immediately after the "D" position, shaft 340 and shutter 350 rotate counterclockwise back to the position shown in Fig. 28. The movement in both directions is very rapid and is caused by mechanism which will be explained. This action of the sprocket shutter produces the horizontal clear lines 126 (Fig. 3) on the film separating the film frames and when the film clutch is latched up, the shutter is closed. This, while photographing, prevents light from producing a fogged area on the film. This same feature is important in "card to film" operation if the cards in the card magazine should become exhausted. In that case the machine would stop, and some time would elapse before cards could again be placed in the magazine and the machine re-started.

A suitable funnel-like element 323 (see Figs. 21 and 23) serves to prevent light from coming through the camera lens and striking the film in the camera.

Sprocket shutter operating mechanism

Referring to Figs. 19 and 22, there is loosely mounted on shaft 286 and adjustably secured to gear 284 (Fig. 16) a five lobed cam 364. This cam rotates in a clockwise direction as viewed in Fig. 19 and makes one-fifth of a revolution per film frame. The drive ratio between shaft 286 and the film sprocket 90-92 is one to one. As there are 15 teeth on the film sprocket, a fifth of a revolution rotates the film sprocket three teeth or one film frame. The lever 366, bifurcated at its free end, beginning at broken line 367, is pivoted on stud 368. Pivoted at 370 in the slotted portion of lever 366 is the lever 372. The lower ends of both levers 366 and 372 are held against cam 364 by spring 374. Another spring 376 between lever 366 and stud 378 counterbalances the weight of lever 366. Links 380 connect the right end of lever 372 to the right end of lever 382. Lever 382 is pivoted on a stud 384. Links 386 connect the left end of lever 382 to lever 388. Lever 388 is pivoted at its upper (right) end on stud 378. Lever 388 has formed in its left end a slot, or jaw, which engages a pin 390 secured in a lever 392 which is loosely mounted on shaft 340 (Fig. 27). Pinned to shaft 340 is the rectangular block-like arm 394 within a recess formed in lever 392. A rigid but adjustable connection is provided by set screws, between levers 392 and 394. Lever 392 is limited in its movements by adjustable stop screws 396 and 398 in bracket 400 on main supporting plate 290.

Lever 372 can be adjusted with respect to lever 366 by means of the channel shaped member 402. Pin 370 is a close sliding fit in channel 402 and lever 372. The hole in lever 366 is slotted as shown. Channel 402 has a slotted hole at its right end where it is fastened to lever 366 by means of a screw 404. By loosening screw 404 channel 402 can be moved to adjust lever 372 with respect to lever 366. This adjustment controls the length of time that the shutter is closed, as will appear. Pin 370 is fast in channel 402.

In operation, the above adjustment is made so that, as cam 364 rotates, the lower end of lever 372 moves upwardly from the high to the low portion of the cam due to action of spring 374 when the lever drops off the cam. Lever 372 thus rotates clockwise, as viewed in Fig. 19, about the pivot pin 370. This causes clockwise rotation of lever 388 about the pivot 378 and consequent counter clockwise rotation of shaft 340, thus causing closure of the sprocket shutter (Fig. 27). Lever 392 moves against the stop screw 396 (Fig. 19) which controls the amount of shutter closure. Continued rotation of cam 364 causes the left end of lever 366 to move upwardly carrying the pivot pin 370 upwardly with it. This action causes lever 372 to rotate counterclockwise as it must pivot about its lower end which is held against the cam. This causes counterclockwise rotation of lever 388 about the pivot stud 378 and consequent clockwise rotation of shaft 340, which opens the sprocket shutter. This action is positively limited by the tail 393 of lever 392 abutting the stop screw 398.

Further rotation of the cam in going from the lower portion to the next high portion does not cause movement of lever 388 and shaft 340 because the movements of levers 372 and 366 cancel each other during this period. The above description shows how tripping actions are obtained for both the closing and opening of the shutter and how these two rapid movements are derived from the same cam.

Cam 364 has an integral flange portion 401 fast on the inner face of gear 403 (see Fig. 22) by means of two screws 405. The holes in the gear, through which the screws extend, are slotted and an eccentric plug acts on a radial groove cut in the flange portion 401. This eccentric plug has a screw driver slot and extends through gear 403. To adjust the timing of cam 364, screws 405 are first loosened, and then by rotating the eccentric plug by means of a screw driver, the timing can be advanced or retarded as desired. Shaft 286 can be adjusted with respect to gear 403 by means of set screws 406 which act on either side of a lug extending out from gear 403 (Fig. 22).

Drive to film take-up shaft

A grooved pulley 410 (Fig. 22) accommodates a spring belt 412 which extends underneath idler pulley 414, around two idler pulleys 416 (Fig. 16) and around the pulley 418 on film take-up shaft 420. The pulley ratio is such that the shaft 420 is overdriven, thus keeping the film tight on the take-up pulley.

Film ventilating means

Due to the heat radiated by the projection lamp, a blast of cool air must be directed on the film as it passes over the sprocket, to prevent damage to the film. A blower 430 (Figs. 15, 16) sucks air through a dust filter built into the rear cover of the optical cabinet and delivers it to the hose 432. This hose has two branches and the vertical branch 434 leads to a duct 436 fast on the rear of the camera plate 290. Duct 436 discharges air to an elbow fitting 438 (see also Fig. 19) which extends through plate 290 and directs air onto the film. A small branch tube 440 blows air onto the condensing lens directly below the projection lamp (see also Fig. 21). Referring to Fig. 19, an air vane 442 is fast on a shaft 444 journaled in the walls of duct 436. On a flange at shaft 444 is a crank pin 443. Air blowing through the duct 436 acts against vane 442 to cause clockwise rotation of shaft 444. This causes crank 443 to bear against the spring-wire actuating lever 446 of the acro switch 450 causing closure of the switch contacts. A weight arm 452 counterbalances the vane 442. If air fails to blow through duct 436, vane 442 and the parts controlled by it, will return to the position shown in Fig. 19, and the switch contacts will open, turning off the projection lamp and stopping the operation of the machine.

The horizontal branch 454 of hose 432 (Fig. 16) supplies air to the bottom of the optical cabinet. The air is exhausted through the camera case by passing upwardly past the projection lamp 130 (Fig. 21), through tubular fittings 426 and 428, into the top of the camera case and out through the light-baffle 456.

Film shafts and guide rollers

Fig. 29 shows the film threaded in position with the vertically sliding support in its up position. The film 60 to be photographed, or projected, is loaded on reel 80 on shaft 460 with the emulsion side towards the core. The film then goes around equalizing roller 82, over the swivel roller 84, under pressure rollers 86, over small roller 94, around equalizing roller 96 and to the take-up reel 98 on shaft 420.

The supply reel assembly is shown in detail in Fig. 18. Bearing housing 466, attached to plate 290, contains two ball bearings 468. Shaft 460 has an integral flange and hub 470 which abuts the inner race of ball bearing 468 at the right. A friction disc 472 is pinned to the shaft. A spring 474 keeps the bearings slightly loaded in thrust. A combined cam-and-groove pulley 476, loose on shaft 460, has on its right side a disc of brake lining. A spring 478 between collar 480 and cam 476 exerts pressure between the friction lining and disc 472. Collar 480 is mounted on ball bearing 482. Tension of spring 478 can be varied by the nut on the end of shaft 460. A long tension spring 484 is wrapped around pulley 476 and secured to a pin in the pulley rim, its other end being anchored on the housing (Fig. 16). A hole in the flange of reel 80 engages a pin 486 riveted to flange 470 (Fig. 18). The pivoted locking lever 488 is in line with the shaft when the reel is placed on the shaft, and is moved to its locking position when the reel is in the position shown. A spring 489 holds lever 488 impositively in either of its positions. Referring to Fig. 16, the normal position of cam 476 is shown with no tension on the film. In this position spring 484 holds projection 490 of cam 476 against stop pin 492. As film is pulled off the supply reel, shaft 460 rotates counter-clockwise as viewed in Fig. 16. Cam 476 also rotates counter-clockwise due to friction disc 472 (Fig. 18) until projection 490 abuts the stop pin 494 (Fig. 16). During the rotation of cam 476, spring 484 wraps itself around the pulley. Cam 476 is so shaped that about midway in its rotation (Fig. 16), between stop pins 492 and 494, plunger 496 is depressed to close the contacts of the acro switch 498 (Figs. 16 and 18). After cam 476 is arrested by stop pin 494 further rotation of shaft 460 is resisted by the friction discs, thus keeping tension in the film as it is pulled from the reel. Since a friction brake exerts a retarding force only while the shaft is rotating, spring 484 was added to exert a static tension on the film if the machine should be stopped in the middle of a run.

Referring again to Figs. 9, 20 and 29, roller 82 rotates on a stud 500 on a bracket 502 which can turn and swivel in all directions within reasonable limits to avoid undue strain on the film.

Roller 84 comprises two spaced-apart discs rotatable on a short shaft supported at its middle on a vertical stud which is free to rotate in order that the discs may adjust themselves to the film.

Rollers 86 are mounted on the lower ends of bent arms 504 pivoted at 506 on the bottom of the sliding support and are movable vertically by hand lever 508 (Figs. 20, 28 and 29). When down, as in Fig. 20, the film is wrapped around the upper half of the sprocket 90—92. Roller 96 is similar to roller 82.

The take-up reel 98 is secured to shaft 420 in the same manner that supply reel 80 is secured to shaft 460. Shaft 420 is journaled in ball bearings the same as shaft 460 but is much simpler in construction, carrying at its rear end only the spring-belt pulley 418 (Fig. 16).

Vertically adjustable sliding support

At its lower end, this assembly surrounds and is guided by cylindrical member 510 which contains lens assembly 132 (Fig. 29). Its upper end is guided in like manner by tubular member 425 (Fig. 20). Members 426 and 510 are attached to the camera supporting plate 290 by screws and are connected to each other by the vertical rack 512 (Figs. 20, 23). Horizontal rectangular plates 514 and 516 surround members 426 and 510 at the top and bottom, respectively. These plates are connected by the bar 518 at the left, bar 520 at the right, and plate 522 at the front (Fig. 29).

Bar 512 is equipped with rack teeth 523, with a vertical slot 524 (Fig. 23) having countersinks at top and bottom and a locking plate 525 fastened to it by screws. A pinion 526 with an integral hollow shaft is journaled in the block 527 fast on bar 520 (Fig. 23). Pinion 526 engages rack teeth 523 and is rotatable by lever 508. A thumb operated plunger 528 extends through pinion 526 (Fig. 24) and its rounded end abuts the conical surface of detent 530, which is free to reciprocate in holes in bar 520 and block 527 against spring 531. The tip 532 of detent 530 rides in the slot 524 (Fig. 23). In the downward position of the sliding support, tip 532 of detent 530 rests in the countersink at the bottom of slot 524 (Fig. 23).

Plates 514 and 516 each carry two rollers 525, (Fig. 24). Each roller is on a horizontal axis and the rollers are spaced 120° apart. The shafts on which the rollers turn are clamped in grooves formed in plates 514 and 516. The rollers in plate 514 are held firmly against cylindrical member 426 and those in plate 516 are held firmly against the cylindrical member 510 by four balls 533 in block 527 which are spring-pressed against the bar 512 (Fig. 25). This action tends to force plates 514 and 516 to the right as viewed in Fig. 29 thus holding the rollers against their contacting surfaces.

Fig. 23 shows the sliding support at the bottom of its stroke which would correspond with Fig. 20. To raise the support it is first necessary to depress plunger 528 with the thumb (Fig. 24). This moves the tip 532 of the detent 530 away from the countersink at the bottom of the slot 524 (Fig. 23). The handle 508 can then be rotated until the end of detent 530 encounters the top of the slot 524 (Fig. 23). At this point, the plunger 528 can be released which will allow the end of the detent to enter the hole in the locking plate 525 thus holding the sliding support at the top of its stroke (Fig. 29).

The film pressure and wrapping rollers 86 are carried on the lower ends of bent arms 504 which are pivoted at their upper ends on plate 516 (Figs. 20, 28, 29). In their up position vertical coil springs 505 pull the rollers together as indicated in Fig. 29. In their upward position the gap between rollers is slightly less than the diameter of the film sprocket 90—92 (Fig. 28). With the film threaded as shown in Fig. 29 the support may be lowered by depressing detent 528 and lowering handle 508. As the rollers descend, they carry the film with them and wrap it around the sprocket. Care must be taken to see that the sprocket holes in the film are in line with the sprocket teeth. The film will now be in the position shown in Figs. 20, 28. In its lowered position, the sliding support closes the contacts of an acro switch 533 by means of the bent over bracket 535 (Fig. 29).

Start and stop notch sensing devices

Referring to Fig. 22, lever 540 is pivoted on vertical stud 541 on bracket 542 secured to plate 294. The right end of the lever carries a small roller 544 and the left end carries a spring leaf 546 which operates the plunger 543 of the acro switch 550. Lever 540 is urged counter-clockwise by spring 502. With film threaded around the sprocket drum, roller 544 rides against the front edge of the film and keeps the contacts of switch 550 closed. When the roller encounters a start notch, the arm 540 rotates counter-clockwise allowing the contacts of switch 550 to open momentarily.

In similar manner stop notch sensing lever 556 operates the stop switch 560.

Film centering device

Referring to Fig. 22, angle 570 is secured to plate 290 (see also Fig. 29). Block 572, secured to bracket 570 by bolt 574 has pivoted to it at its ends the arms 576 and 578. The left ends of arms 576 and 578 carry the pivoted shoes 306 and 308 which bear against, and guide, the film (see also Fig. 27). Links 580 and 582 are pivoted at one of their ends to arms 576 and 578 and at their other ends to lever 584 which is freely mounted on a vertical stud 586 on angle 570. Spring 585 urges lever 584 clockwise against adjustable stop 588. This arrangement is such that when the sliding inclosure is down and no film is in the machine, the shoes 306 and 308 clear the shoulders of the film sprockets (Fig. 22). Spring 585, through links 580, 582, urges the film guide shoes 306 and 308 together equally by means of arms 576 and 578, and associated links, which form a self-centering device adapted to adjust itself for slight variations in width of film, the centerline of the film always being maintained in the same vertical plane in the machine.

Arm 578 has attached to it a downwardly extending bracket 590 and arm 576 carries a similar bracket 592 (Fig. 29). Each of these brackets contains a horizontal slot. The horizontal slot in bracket 590 is located by the eccentric stud 594 which can rotate in a hole in plate 290 (Fig. 22). The threaded end of stud 594 passes through the elastic stop nut 596 on the back of plate 290. A screw driver slot in the large end of stud 594 enables it to be easily turned to adjust arm 578 so that shoe 308 is held close to the top of the sprocket half 90. Bracket 592 is located by a similar stud 598.

Links 600 (Fig. 22) connect an arm of lever 584 to the end of a lever 602 which is on vertical shaft 604 journaled at its upper end in angle 570 and at its lower end in a bracket 605 (Fig. 26). A cam 606 also fast on shaft 604 is arranged to cooperate with the rollers 608 (Figs. 23, 26) which are supported on the lower end of a link 610 hanging from and pivoted to the plate 516 of the sliding support (Fig. 23). When the sliding enclosure is down there is clearance between the cam 606 and the rollers 608 so that lever 584 is free to take up its position controlled by the width of the film and spring 585 (Fig. 22). When the sliding support is raised, the rollers 608 act on the cam 606 to cause counter-clockwise rotation of shaft 604 as viewed in Fig. 22. This causes counter-clockwise rotation of lever 584 and consequent forcing apart of arms 576 and 578. The left ends of arms 576 and 578 abut lugs on notch sensing levers 540 and 556 thus also forcing them apart. This forcing apart action occurs early in the upward motion of the sliding support. The bottom surface of block 572 has cut into it a keyway 614 which fits over two Woodruff keys 616 embedded in the angle bracket 570. Bolt 574 has an eccentric portion which engages a square notch cut into bracket 570. By loosening the nut at the bottom of bolt 574 and turning the head, the block 572 can be made to move at right angles to plate 290. This movement is transmitted to the shoes 306 and 308 thus controlling the position of the film on the sprocket. A spring contact assembly 620 (Figs. 23 and 26) is fastened to the bottom of bracket 570. The ends of these contact members can be seen in Fig. 28. The lower blade 622 extends underneath the film sprocket and if, for any reason, film should get caught on the sprocket and try to wind itself around the sprocket, it would strike blade 222 thus opening the contacts 223 and causing the machine to stop.

Frame indicator

Referring to Figs. 16, 20 and 29, an arm 630 rests on the outer layer of film on reel 80. As the film is drawn off the reel, arm 630 moves downwardly, and through the connecting linkage, rotates lever 632, fast on pivot 634, which is journaled in a bearing on plate 290 and extends back into the camera case. On the rear end of shaft 634 is mounted a chart 636 engraved with translucent numbers which indicate "hundreds" of film frames. A small light bulb 799 (Fig. 35b) behind the chart illuminates the numbers, which can be viewed through window 638.

Projection lamp socket

Referring to Fig. 21, the projection lamp 130 is held in a spherical support 650 by screw 652 and its associated plunger 653. The outer spherical surface of 650 is held against the internal spherical surface of the main socket member 654 by means of ring 656 and clamping ring 658. Socket 654 is fastened to plate 290 by screws through vertical slots in the plate, and adjustment is made by screws 660, 662 at top and bottom. Electrical connection is made to the lamp by amphenol plug 664.

Condensing lens

Referring again to Fig. 21, the condensing lenses 132 are mounted in a brass sleeve 670, supported by the cylindrical member 510 which is partially split and can be clamped onto sleeve 670 by means of screw 672 (see also Fig. 29). There are four elements in the condensing lens, the two lower being spherical and the two upper being cylindrical.

Camera lens

Referring to Fig. 21, the lens 110 is mounted in the lens tube 680, which is formed with an integral flange portion 682 at its top, to which is fastened the upper end of a bellows 684, the lower end of which is attached to an annular plate 686 which bears against the bottom of the camera case. The bellows permits up and down movement of the lens tube 680 and also prevents stray light striking the film.

Referring to Fig. 20, a bracket 690, attached to the bottom of the camera case, is fitted with a pair of rollers 692 at its top and a pair of rollers 694 at its bottom. The rollers are all in contact with tube 680. Only one of each pair of rollers is shown in Fig. 22, the other roller of each pair being behind the tube. The contact points of each pair of rollers with the tube are 120° apart. A flat ring 696 which loosely surrounds tube 680, making contact with it on the right hand side only, as viewed in Fig. 20 is drawn by spring 698, to hold tube 680 firmly against rollers 692 and 694. A spring 700, attached at its upper end to lens tube 680, holds the tube down against the top of an adjusting screw 702. Screw 702 is threaded through a split portion of plate 704 fastened to the bottom of bracket 690 and may be clamped in position by screw 706. Thus, the vertical position of the lens with respect to the film can be changed by adjusting screw 702, the lens tube 680 moving up or down on rollers 692 and 694. This adjustment controls the enlargement of the image.

Plate 290 is attached to the inner wall of the camera case 202 (Fig. 1) by four studs 710, through slotted holes in the plate (Fig. 20), so that the plate can be moved up or down with respect to the camera lens in order to get the correct focus and enlargement. This adjustment is made during assembly and is not changed in use.

Sliding support nudging device

Referring to Figs. 30 and 31, gear 296 on shaft 286 (Fig. 22) has attached to its side a gear 710 which meshes with an idler pinion 712 rotatable on a stud 714 on plate 716 attached to plate 290. Gear 712 meshes with a gear 718 rotatable on stud 720. A two-lobed cam 722 rotates with gear 718. Two revolutions of gear 710 rotates the cam gear five revolutions. The two high portions of cam 722 contact roller 724 in such manner that once every cycle, at the "D" position, plate 516 of the sliding support is given a sharp upward nudge. This causes the rollers 86 to rise slightly, thus relieving the tension in the film and reducing the friction between the film and the sprocket 90—92.

Assuming that a set of punched tabulating cards are to be reproduced on a film, the procedure is as follows: plug connections 750 (Fig. 35b) are established by the operator. Plug connections are also established between the punch brush plug sockets 751 (Fig. 35d) to the shutter magnet plug sockets 752. The handle 166, Fig. 12, is then placed in the card to film position. The tabulating cards, which are to be recorded on the film, are placed in the card magazine P of the punching unit (see Fig. 13). Switch 753 (see Fig. 35a) is now turned to "on" position. With such switch in the "on" position, alternating current is supplied from the lines 754 to lines 755 and 756. Relay HD3 is now energized. Relay contacts HD3a now close and a circuit is completed which is traced as follows: From one of the lines 754, through relay contacts HD3a, through line 757, to and through the drive motor 758 of the motor generator unit of the machine, and back to the other side of the A. C. line 754. The driving motor 758 drives the D. C. generator unit 759. This D. C. generator, when it has attained speed, will apply direct current to lines 760 and 761.

A pilot light 762 is in circuit across these lines and when this pilot light glows it will apprise the operator that proper voltage is available for machine operations. Line 760 is preferably grounded as indicated on Fig. 35a. From line 760 a further circuit is established via wire 763.

With direct current applied to lines 760 and 761 the circuit is established through the plug connection 750 previously described to energize relay R112.

Figure 35A:
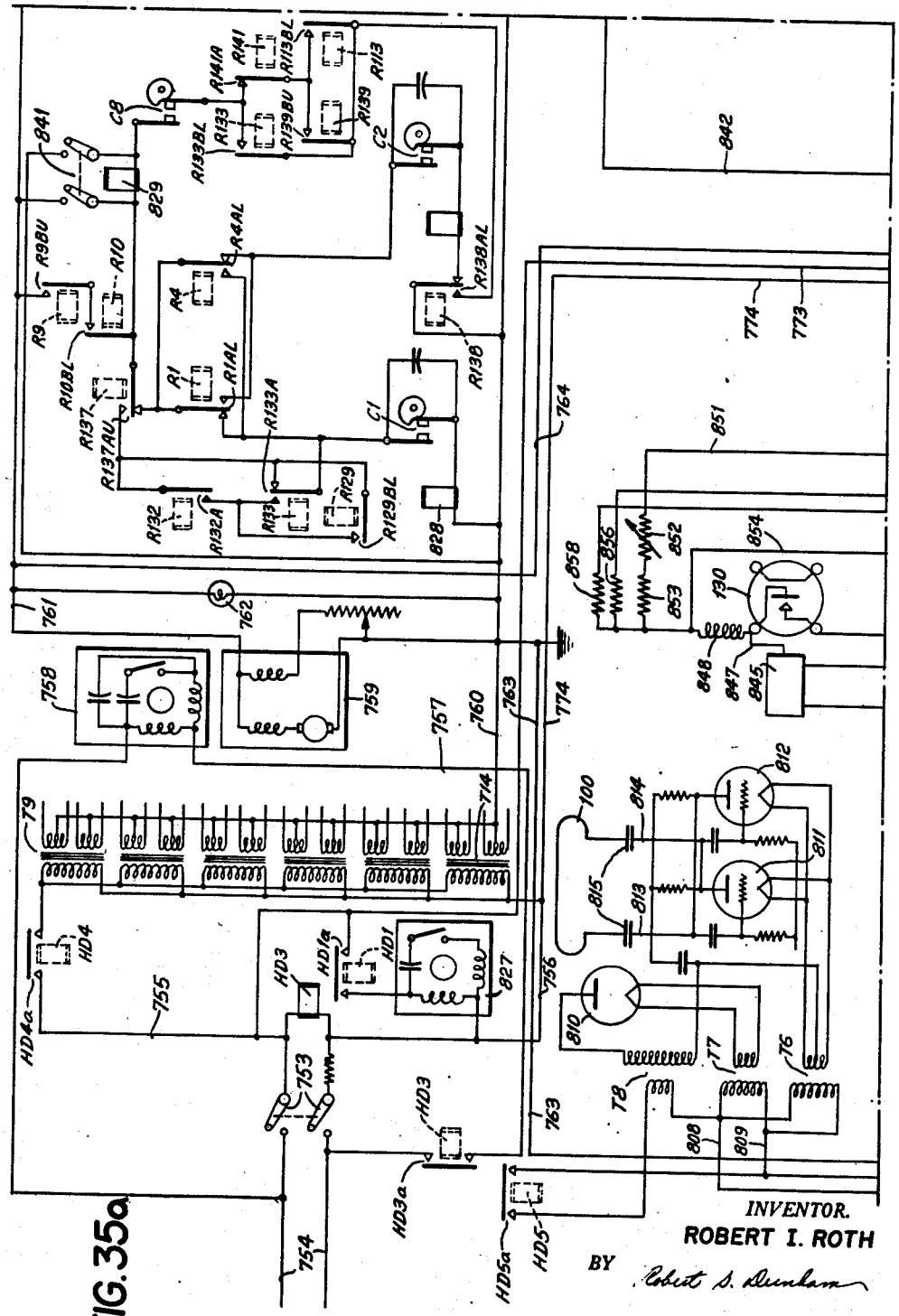

With relay R112 energized relay contacts R112AU shift to reverse position shown in Fig. 35b. With relay R112 energized, relay contacts R112AL (Fig. 35b) close and a circuit is established which will be traced as follows: At line 761 (Fig. 35a), via wire 764, via wire 765 (Fig. 35e), via wire 766 (Figs. 35f and 35b), through the now closed relay contacts R112AL, via wire 767 (Figs. 35b and 35f), to and through relay coils R111 and R110, and back via line 763.

Relay contacts R112BU (Fig. 35b) close and a circuit is established from line 761, through relay R113 back to line 760. With relay R112 energized, contacts R112BL (Fig. 35b) close to energize relay coils R138 and R137.

It may be here mentioned that relays R137 and R138 are energized both for "card to film" and "film to card" operations. Relays R112, R110, R111, and R113 are always energized for "card to film" operations, and in conjunction with relays R137 and R138 condition the machine for "card to film" operations.

With relay R110 energized, relay contacts R110AL (Fig. 35f) close and a circuit is established from line 765 (Fig. 35b), via wire 768 (Figs. 35e and 35f), through the contacts R110AL, through resistor 769, relay contacts R126BL in the position shown, and back to line 763.

When resistor 769 heats up, it shifts a bimetallic contact element to close relay contacts R126a and thus provide a delay for the closure of these contacts. With R126a closed, a circuit will be established to the relay coil R126, this circuit being completed in line 768, through the R110AL contacts, the R126 relay coil, the R126a contacts, and back to line 763. With relay R126 energized, contacts R126BL shift to shifted position to interrupt the circuit through resistor 769 and to also provide a holding circuit for relay R126 around the R126a contacts which open upon the cooling of resistor 769. R126 is thus provided with a time delay for delaying the application of plate potential to the thyratron 785 until it has had time to heat up. With relay R126 energized, relay contacts R126B (Fig. 35f) close to energize relay R127. With relay R110 energized (Fig. 35f) relay contacts R110BU close to apply 90 volts of potential, which is available on wire 770, to line 771 to the anode of photocell 772 (Fig. 35b).

Photocell 772 is a photocell of the blue-sensitive type. It is utilized because the light source 100 (Fig. 35a) is a blue type of fluorescent lamp and a blue-sensitive type of photocell is readily influenced by the light of the fluorescent lamp.

Figure 35E:
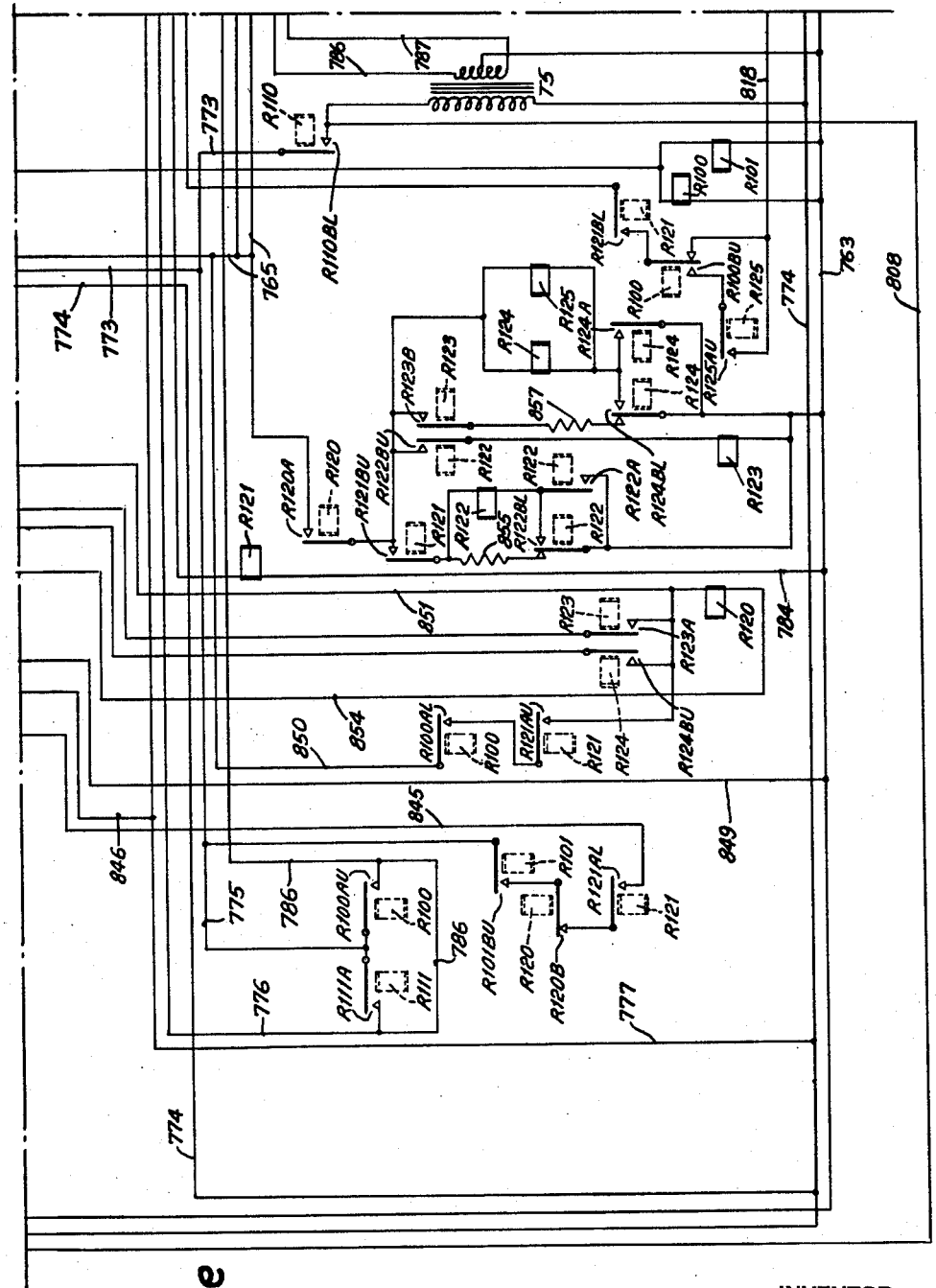

Referring to Fig. 35e, with relay R110 energized contacts R110BL close to complete a circuit through switch 753 (Fig. 35a), via line 773 (see Fig. 35e), to and through closed contacts R110BL, through the primary of transformer T5, via line 774, and back to the other side of switch 753 (Fig. 35a).

With relay R111 energized, relay contacts R111A (Fig. 35e) close and a circuit is established from line 773, via wire 775 (Fig. 35e), through the relay contacts R111A, now closed, and back via line 776 to blower motor 430 (Fig. 35b), thence via wire 777 (Fig. 35f), to wire 774, which is the other side of the A. C. line.

With relay R128 (Fig. 35b) energized in a manner to be subsequently described, a circuit will be established from line 760 (Fig. 35b) through the "White" signal light 778, through the relay contacts R128BU, now closed, back via wire 779, (see also Figs. 35b and 35f) to and through the now shifted relay contacts R111B, and back via lines 780 and 806 to D. C. line 761 (Fig. 35b).

Relay contacts R111B short out the contacts R125AL when the machine is operated on "card to film" operations.

With relay R113 energized, relay contacts R113A (Fig. 35c) are open and interrupt a circuit to the start key 781. This interrupted circuit is the circuit which is used when the machine is to operate on card to card operations. On "card to film" operations, which is the operation now being described, the circuit through the start key will be established through the contacts R134AU which will be closed when relay R134 is energized in a manner to be presently described.

When the blower 430 (Fig. 35b) gets up to speed, the switch 450 (Fig. 35b) closes, and the circuit is established as follows: From wire 761 (Fig. 35a), via wire 764, wire 765 (Figs. 35e and 35f), via wire 782, through switch contacts 450, via wire 783 through relay coil R121, via wire 784, to line 763, which is the opposite side of the D. C. line. With relay R121 energized, relay contacts R121BL close to partially establish a pickup circuit for relay R134 which will be energized in a manner to be subsequently explained. The other contacts controlled by relay R121 are now ineffective because their circuits are interrupted by other relay contacts.

The previous description has explained the manner in which the primary of transformer T5 was connected in circuit. The secondary of this transformer supplies heater current for the fluorescent lamp control thyratron 785. Lines 786 and 787 connect the secondary to the heater element of thyratron 785. The center tap of the secondary winding of transformer T5 is connected to the grounded D. C. line 763.

Relay contacts R111A having been closed in the manner previously explained, a further circuit is established through these contacts via a wire 786 to one side of the primaries of transformers T2 and T3. The other side of these primaries connects to a wire 774 which connects to the other side of the A. C. line. The secondary winding of transformer T2 supplies current to the primary of transformer T1 and the secondary of this transformer provides about 110 volts A. C. supply to lines 788 and 789. The purpose of this transformer arrangement just described is to isolate the potential on lines 788 and 789 from the main A. C. lines, one of which main lines is grounded. The output of transformer T1 is rectified and doubled by the small selenium rectifiers 790 and their associated condensers. The output is applied to a bleeder which is comprised of two potentiometers 791 and 792. The voltage across the outer terminals of the two potentiometers is kept constant at 105 volts by a voltage regulating tube 793 and a dropping resistor 794. The center tap of potentiometer 792 is connected to the grounded D. C. line 763. The lower point of potentiometer 792 provides the negative bias for the grids of all of the thyratrons used in the present machine. Such negative bias supply for the 785 thyratron is provided through a circuit via wires 795, 796 to the grid of the 785 thyratron.

The center tap of the potentiometer 791 is adjusted to provide 90-volt potential for the anodes of the various photocells. The circuit extends through the closed relay contact R110BU via line 771 to a photocell such as 772.

The secondary of transformer T2 also supplies A. C. voltage via lines 797 and 798 to a small light bulb 799 (Fig. 35b), which is associated with the frame indicator of the machine.

The secondary of transformer T3 supplies potential to the primary of transformer T4 and the secondary of transformer T4 supplies potential between ground 763 and line 800. This circuit extends through the now closed relay contacts R127A (Fig. 35f) via line 801, through relay coil R128 (Fig. 35b), line 802, through relay contacts R110AU (Fig. 35f), via line 803 to the plate of thyratron 785.

As explained before, relay R127 is controlled by relay R126, which is a time delay relay. This time delay is provided to give the heater of the thyratron sufficient time to heat up before plate potential is applied.

When light from the fluorescent lamp 100 strikes the photocell 772, this photocell will cause its associated thyratron 785 to become conductive for every half cycle of the alternating current applied to the plate of this thyratron. The circuit heretofore traced to the plate of this thyratron will extend through to the cathode and thence flow by line 804 to line 763, which is the grounded negative side of the D. C. line.

The foregoing circuit through the plate of the thyratron extended through relay coil 128 and energized this relay. The current which flows through the relay coil R128 consists of half wave rectified A. C. and a condenser 805 is preferably connected across the coils of relay R128 to reduce the chattering tendency of such relay. When light no longer impinges on the photocell 772, the related thyratron 785 will automatically quench itself and cause deenergization of relay R128. With relay R128 energized, relay contacts R128BU are closed to provide current supply to the white signal light 778.

With relay R127 energized, relay contacts R127B (Fig. 35f) close and a circuit is completed from line 761 (Fig. 35b), via wire 806, through the now closed relay contacts R127B, via wire 807, to and through relay coils HD5 and R136, which are in parallel, and back to line 760.

Provision is made for supplying alternating current at a moderately high frequency to the fluorescent lamp to improve the image on the film. If a 60-cycle supply were provided images which are desired to be solid black would appear with alternate dark and light bands. This moderately high frequency is provided for by the arrangement which will now be described:

Referring to Fig. 35e, a branch circuit extends from the now closed relay contacts R110BL, via wire 808 to one side of the primaries of transformers T7 and T6. The other side of the primaries of these transformers connect to a line 809 which extends to line 774, which is the other side of the A. C. line. The secondary of transformer T7 supplies heater current for the rectifier tube 810. The secondary of transformer T6 supplies heater current for the triodes 811 and 812. Tubes 811 and 812 are connected in a conventional multi-vibrator circuit and provide an output on lines 813 and 814 which extend to the fluorescent lamp 100. The lines 813 and 814 are coupled by means of condensers 815 to the fluorescent lamp. Condensers 815 prevent the application of D. C. potential to the lamp.

Relay HD5 was energized in a manner previously explained, closing contacts HD5a. With these contacts closed the circuit is provided from line 808 (Fig. 35a), through the primary of transformer T8 and hence through and back to line 809. The secondary of transformer T8 will then apply the necessary high voltage to the plate of rectifier tube 810 which tube 810 supplies current to the multi-vibrator circuits associated with tubes 811 and 812. It may be mentioned that the fluorescent lamp 100 will be lighted at the instant the contacts HD5 are closed and such contacts close after a time delay which is of sufficient extent to insure the heating up of the various tubes.

The R136AU relay contacts (Fig. 35b) are in the pickup circuit to relay R134 and the relay contacts 136AL (Fig. 35d) are in the feed circuit to the punch magnets and comparing magnets.

A special conditioning relay (Fig. 35b), R134, is provided to prevent the machine starting until various controls are properly conditioned for the particular type of operation which the machine is to perform. For a "card to film" operation, the circuit for relay R134 extends from line 761 (Fig. 35b) through the non-shifted R102AU contacts, through the closed R128AU contacts, via contacts 177 which are closed when the mirror is in the "card to film" position (see Fig. 33), microswitch 181, which opens only when the mirror is in the "screen" position, through the shifted R112AU contacts, via wire 817 (see Figs. 35f and e), through the R121BL contacts, which are closed so long as air is flowing through the ventilating tube, through the non-shifted R100BU contacts, wire 818, relay R134 (Fig. 35b), to line 760. Relay R134 has normally open contacts R134AU in the start key circuit, normally open contacts R134AL in the stop key circuits, and normally open contacts R134BU in the run out key circuits. These interlocking contacts prevent the operation of the machine if the elements in the control circuit for relay R134 are not properly conditioned.

In other words, before the machine can be put into operation, the mirror has to be in the proper position, the photographic lamp has to be lit, and air must flow through the ventilating tube.

As previously mentioned, relay R137 and R138 are energized for all types of film operations. R137AU relay contacts (Fig. 35a) are in the circuit to the punch clutch magnet 828 (Fig. 35a), and are adapted to place the punch clutch magnet under the control of the film notch sensing devices.

In the reproducing punch shown in the Lake Patent No. 2,032,085, the reading section of the machine is provided with various card levers which include a reading magazine lever RHL, a reading card lever designated RCL1, a reading card lever designated RCL2, a checking brush card lever designated CHC. When this reproducing punch is to be utilized in connection with film operations, provision must be made to disable or divert the circuits extending to the aforementioned card levers. This diversion is effected by the contacts of relay R137 (Figs. 35b and d). This diversion is effected for all of the foregoing card levers except RCL1 (Fig. 35b) which is left to direct the control of its associated relay R4.

Referring to the RHL card lever, diversion is effected by relay contacts R137AL which shift to reverse position when R137 is energized.

Referring now to RCL2 and CHC, diversion of the circuit from these card levers is effected by contacts R137BU (Fig. 35d).

Referring to PHL (Fig. 35b), this card lever is used in the normal manner to control relay R3.

Referring to DCL, R1 is the usual relay controlled by this die card lever but, for film purposes, an additional relay R141 is applied for this circuit. Referring to PCL this card lever is used in normal manner to control relay R7.

Since cards are in the magazine P of the punching unit relay R3 is energized, the circuit being completed through the PHL card lever (Fig. 35b). Since the film is in position in the camera and the sliding enclosure is in down position, switches 550 and 560 are closed. Accordingly, relay R130 and R131 (Fig. 35b) will be energized. An additional switch 533 is in the circuit to the R131 relay. This switch 533 has to be closed to provide for the energization of relay R131 and such switch is closed when the sliding enclosure is in down position. R130, on the other hand, can be energized when the sliding enclosure is in up position.

Referring to Fig. 35b, current flows from line 761, via line 823, through switch 533, which is closed when the sliding closure is in down position, up via line 824, through the R130BU contacts and the R131AL, in parallel, which are both in shifted position, via line 825, through the now shifted R137AL contacts, to relay R6. Energization of relay R6 shifts contacts R6AU (Fig. 35e) to open position. A branch circuit extends through the closed R130BU and R131AL contact points to energize relay coil R135 and a further branch circuit extends through the same contact points to energize relay R4.

Assuming that cards, which are to be reproduced on the film, are in the hopper P of the punching section of the machine and that the camera is properly loaded with film, the operator starts the machine in operation by depressing the start key 781 (Fig. 35c).

The depression of the start key will establish a circuit from line 761 through the customary comparing contacts 821 in the position shown, to and through the start key 781, through the now shifted R6BL contacts, through the parallel R1BU contacts and R25BU contacts in the positions shown, through the now shifted R3BL contacts, through the R134AU contacts now closed, through the coil of relay R10, to the negative side of line 760.

Energization of R10 closes contacts R10AL (Fig. 35c), thereby completing a circuit from line 761, through line 826, through the now closed R10AL contacts to energize the HD1 relay.

A branch circuit is also established through the R10AL contacts, to and through the now closed R13B contacts to energize relay R9. Energization of relay HD1 (Fig. 35c) will close contacts HD1a (Fig. 35a). The circuit will be completed from one side of the switch 753, through line 773, through the now closed contacts HD1a, to and through the driving motor 827, and back to the other side of the line. The driving motor now sets in motion the constantly running parts in the punching unit and the constantly running shaft, which drives the cam unit. Machines of this type ordinarily stop at a certain index point position, for example, between 6 and 9, see timing chart, Fig. 37. With the machine in this position (before the driving motor started), when the C3 cam contact makes (Figs. 35c and Fig. 37) a holding circuit will be completed from line 826 through C3, through stick contacts R9AL now in closed position, to hold relay R9 energized. A branch holding circuit for relay HD1 will be established through the R13B contacts now closed. The now closed R9AU contact points provide a holding circuit for relay R9 through the closed R10AL contact points during the time that cam contacts C3 are open.

Referring to Fig. 35d, a circuit is established from line 761 through the now closed RC2 cam contacts directly to relay R24 to energize it. With relay R24 energized, relay contacts R24B close and a further circuit is established from line 826, through P5 now closed, through R24B in closed position, the F2 cam contacts now in closed position, through the R10AU contacts, through the coil relay R10 to line 760. This provides a holding circuit for R10.

Referring to Fig. 35a, a circuit will be established from line 761, through the R9BU contacts now closed, through the now closed R10BL contacts, through the now shifted R137AU contacts, through the contacts R133A in the position shown, through the C1 cam contacts which close at the proper time in the cycle, through the punch clutch magnet 828, and back to the negative side of the line 760.

A circuit through the single revolution camera clutch magnet 829 (Fig. 35a) is established from line 761, through the now closed R9BU contacts, closed R10BL contacts, through the camera clutch magnet 829, through the C8 cam contacts, through the now closed R14A contacts, through the now closed R113BL contacts, through the shifted R138AL contacts, to line 760. A card feed cycle and a film feed cycle will then be initiated.

In the first cycle, a card will be fed in the punching unit from the magazine to the punching die, closing the DCL contacts (Fig. 35b), and energizing relay R141 and relay R1.

The energization of relay R141 will open up contacts R141A (Fig. 35a) and thus interrupt the circuit to the camera clutch magnet 829 to prevent film feed in the second cycle. In other words, one frame of the film will be fed and thereafter film feed will be interrupted.

The energization of relay R1 causes the relay contacts R1BL (Fig. 35c) to close and when the cam contacts P3 close a circuit will be completed from line 761, cam contacts P3, relay contacts R1BL, to and through the pickup coil of relay R2 to line 760. Relay R2 holds by a circuit extending from line 760 (Fig. 35c) hold coil of relay R2, now closed relay contacts R2AU, line 894 (see also Fig. 35b) now closed DCL contacts to line 761.

Referring to Fig. 35d, with relay R138 energized, contacts R138AU will be in shifted position and the circuit will be established from line 761 through the shifted R138AU contacts, through the R2AL contacts now in closed position, through cam contacts P6, through line 830 (Fig. 35b), through the R113BU contacts now closed, through relay R133, and back to the other side of line 760.

As noted before, the film does not feed in the second cycle but the card feed continues, the first card feeding to the punch brushes, and the second card feeding to the punching die. Since there is a card in the punching die the DCL contacts are closed, and a holding circuit is established from line 761, through the R133BU stick contacts now in shifted position, back to the other side of the line, through relay R133. Relay contacts R133A (Fig. 35a) shift to interrupt the circuit to the punch clutch magnet 828. The punch clutch magnet 828 being deenergized, the punch clutch will latch up at the end of the second cycle with the first card about to be read at the punch brushes. In the second cycle relay contacts R133BL close to re-establish a circuit to the camera clutch magnet 829, to again reinitiate film feed in the third cycle. Near the end of the second cycle, PCL contacts (Fig. 35b) close to energize relay R7.

Film controlled switches 623 and 498 (Figs. 35c, 28 and 16) are now closed. Accordingly a circuit is established from line 761, through branch circuit 831, through the film control contacts 623 and 498, to and through relay coil R40, and back to line 760. A holding circuit for relay R10 is established through the stop key contacts 832. This circuit extends from line 761, through the comparing contacts 821 in the position shown, through the stop key, through the closed R128AL contacts, through the closed R134AL contacts, through the closed R140AU contacts, up via line 833, through the shifted R4BL contacts, through the shifted R6AL contacts, through the shifted R7AL contacts, through the closed R1AU contacts, through the shifted R3AL contacts, through the now closed R10AU contacts, to the coil of relay R10 to the negative side of line 760. The start key 781 (Fig. 35c) can now be released and the motor will continue to run. Alternately, starting the machine can be brought about by repeated depressions of the starting key.

Film feed will continue, and when the start notch in the film is sensed by roller 544 (Fig. 22), switch 550 will open momentarily, causing deenergization of relay R130 (Fig. 35b).

With relay R130 thus deenergized, relay contacts R130BL will shift back to the position shown in Fig. 35b. The circuit will be established from line 761, through 130BL in the position shown, through the now closed R140BU contacts, to and through relay coil R132, to the other side of line 760.

A holding circuit for relay 132 is established as follows: From line 761, through the closed R131AU contacts, the closed R132BU contacts, the closed R140BU contacts, to and through relay coil 132.

With R132 energized, contacts R132A (Fig. 35a) will close and the circuit will be established from line 761, through R9BU contacts, and the B10BL contacts, both closed, through the shifted 137AU contacts, through the now closed R132A contacts, through the shifted 133A contacts, through cam contacts C1, to and through the punch clutch magnet 828, to the other side of the line, so that, on the cycle following the sensing of the start notch of the film, cards will feed in synchronism with the film.

The machine is then ready to sense the data perforations on the cards and to control the shutter magnets in accordance with the data sensed from the card.

Referring to Fig. 35d, when cam contacts P1 close, the circuit will be completed from line 761, through the now shifted R135AU contacts, through the customary circuit breakers F3 and F4, through shutter magnets 112, to the plug sockets 752. Plug connections extend to sockets 751. The circuits will be completed through the punch brushes 118 which sense the perforations in each card, the return circuit extending through contacts R7BU now closed, through the shifted R138BU contacts, and back via wire 886, to the line 760. Photographic recording operations will now continue card by card and film frame by film frame until the stop notch 66 on the film is sensed. When such stop notch is sensed switch 560 will open momentarily, deenergizing relay R131 (Fig. 35b). With relay R131 deenergized, relay contacts R131AU (Fig. 35b) will shift to the open position shown, causing deenergization of relay R132. With relay R132 deenergized, relay contacts 132A (Fig. 35a) assume the position shown, thus opening the circuit to the punch clutch magnet 828. The punch clutch will latch up at the end of the cycle in which the notch in the film was sensed. Film will continue to be fed in the camera until the end of the trailer of the film is pulled from the supply reel. This will allow switch 498 (Fig. 35c) to open, thus causing deenergization of relay R140.

With R140 deenergized, relay contacts R140AU (Fig. 35c) resume the open position as shown, and the opening of these contacts interrupts the holding circuit to relay R10, thus deenergizing relay R10. The opening of the R140AU contact points is ineffective during the time that the R13A contact points are closed as the R13A contact points when closed, provide a shunt circuit around the R140AU contact points. Relay coil 13 is energized each cycle by the closure of cam contacts C4 (see also Fig. 37) and the purpose of the R13A contact points is to prevent the deenergization of relay coil R10 near the extreme end or extreme beginning of a machine cycle. This arrangement insures the deenergization of both the film clutch magnet 829 (see Fig. 35a) and the punch clutch magnet 829 in the same machine cycle upon the opening of the relay contacts R10BL. With relay R10 (Fig. 35c) deenergized, relay contacts R10AL resume the open position shown, so that relays HD1 and R9 will become deenergized when the C3 cam contacts open.

Deenergization of HD1 (Fig. 35c) will cause opening of the HD1A contacts (Fig. 35a), thus stopping the operation of the motor 827. The film will have been fed to a point where the trailer portion has left the supply reel. It is now desired to wind up this trailer over the exposed film on the takeup reel. Such further film feed can be secured by re-depressing the start key, which will energize relays HD1, R9 and R10 in the manner previously explained, so that the film can be fed until the end of the trailer passes over the film feed sprocket.

At this point, switches 550 and 560 will both open, deenergizing relays R130 and R131 (Fig. 35b). With R130 and R131 deenergized, contacts R131AL and R130BU resume the open position shown. With such relay contacts in open position, relay R135 is deenergized, relay R6 is deenergized, and relay R4 is deenergized.

With R6 deenergized, relay contacts R6BL (Fig. 35c) assume the position shown and interrupt the start key circuit, to relay R10, to deenergize R10.

With R10 deenergized, HD1 and R9 will be deenergized in a manner which has been previously explained.

The motor is now stopped and further depression of the start key will be ineffective. The operator can now open the camera door, raise the sliding enclosure and remove the film from the camera.

When relay contacts R140BU reopen, which occurs when the end of the film trailer leaves the supply reel, they interrupt the circuit to relay R132 so that this relay cannot, under these conditions, be energized by any inadvertent closure of the R132BU contacts or the R131AU contacts or the R130BL contacts when the end of the film trailer passes over the sprocket.

*Film to card circuits and operations*

When the machine is to be used for film to card operations, the plug connection 750, which was previously used on card to film operations, is removed and replaced by a plug generally designated 840 (Fig. 35b). This plug, when in place, provides current supply to energize relay R102.

When relay R102 is energized, relay contacts R102AU shift to reverse position to that shown, to partially establish a circuit to R134, through contacts R136AU, and contacts 179, which are closed when the crank is in position for film to card operations. Relay contacts R102AL close and complete a circuit which may be traced as follows: Starting at line 761 (Fig. 35a), via wire 764, wire 765 (Figs. 35e and f), via wire 766 (Fig. 35b), to and through the now closed R102AL contacts, back via wire 842 (see also Fig. 35e), to and through relays R101 and R100 in parallel, to line 763, which is the negative side of the D. C. line.

Relay contacts R102BU (Fig. 35b) complete a circuit from line 761 to relays HD4 and R103, the return circuit being via line 760. Relay contacts R102BL, on closing, establish a circuit to energize relays R138 and R137.

Relay contacts R103AU (Fig. 35b) partially complete a circuit to relay R133. Relay contacts R103AL (Fig. 35c), on opening, interrupt a possible circuit through R113A to relay coil R10, and compel the circuit to this R10 relay to flow through relay contacts R134AU.

A circuit to the blower motor will now be completed, which is traced as follows: Starting at 753 (Fig. 35a), via line 773 (Fig. 35e), via line 775, to and through the now closed R100AU contacts, through wire 776, through the blower motor 430 (on Fig. 35b), back via wire 777 (Fig. 35f and Fig. 35e), via wire 774, to the other side of the A. C. line.

A branch circuit extends from relay contacts R100AU, via wire 786 (Fig. 35f), there connecting to the primary winding of transformer T2. The return circuit to the other side of the A. C. line is via wire 774.

Referring to Fig. 35f, a circuit is also provided for the primary of transformer T3, as will be obvious.

Referring to Fig. 35e, with relay R100 energized, relay contacts R100BU shift to a reverse position to that shown to partially establish a circuit to the R125AU contacts.

With relay R100 energized, relay contacts R100BL are closed, allowing 90-volt potential from the power supply to flow, via line 843, to the anode of one of the photocells 844. It may be explained that the complete machine, in handling 80 columns, has eighty more photocells like 844 and the anodes of these photocells are all connected together and receive potential through the circuit just traced.

Energization of relay R101 closes relay contacts R101AL (Fig. 35f). A circuit is then established from line 761 (Fig. 35a), via wire 764, via wire 768, to and through the contacts R101AL, thence through the resistor 769, through relay contacts R126BL in the position shown, and back to line 763. The previous explanation has explained how the heating of the resistor 769 causes closure of relay contacts R126A with the ultimate energization of R126 and the shifting of contact R126BL to the reverse position to that shown. Relay coil R127 is energized through contacts R126B in the manner previously explained.

The previous explanation has explained how relay HD5 and R136 (Fig. 35b) were energized upon the closure of relay contacts R127B (Fig. 35f).

845 designates a high frequency oscillator which is used to start the arc in the projection lamp. The circuit to this high frequency oscillator will now be traced. Referring to Fig. 35a, one side of the A. C. line, current flows via wire 773 to Fig. 35e, through contacts R101BU, through the normally closed R120B contacts, through contacts R121AL which are in closed position, air being blown through the tube and closing the switch previously described, via wire 845, to and through the high frequency oscillator 845 (Fig. 35a), back via wire 846, via wire 777, via wire 774, to the other side of the A. C. line.

A surge of high frequency current flows from the oscillator 845, via wire 847, and across the arc gap in the projection lamp 130. A radio frequency choke 848 prevents flow of this high frequency current through any path except across the arc gap in the lamp. The high frequency current flows back to ground through line 849.

After the gap across the arc is broken down by the above-mentioned high frequency current surge, direct current will flow across the arc gap, current flowing from line 761, via wire 764 (Fig. 35a), via wire 850 (Fig. 35e), through the relay contacts R100AL, through the now closed R121AU contacts, via line 851, through current limiting resistors 852 and 853, through the radio frequency choke 848, the arc electrode of the lamp, and back via line 849 to the other side of the D. C. line.

Part of the current flowing through the resistors 852 and 853 in series flows via branch circuit 854 (see also Fig. 35e) to relay coil R120, and the return line from this relay is through line 851.

With relay coil R120 energized, relay contacts R120B will open, thus interrupting the starting circuit to the high frequency oscillator 845.

The lamp 130 now burns with a reduced amperage of about 2. Provision is made, after a time delay, to increase the amperage through the lamp. This is done in two steps:

Starting at line 761 (Fig. 35a), down via wire 764, to Figure 35e, through relay contacts 120A, through relay contacts R121BU, through a time delay resistor 855, through relay contacts R122BL in the position shown, and back to the other side of the D. C. line. Heating of resistor 855, after a time delay, causes closure of the contacts R122A, thus energizing relay coil R122. Thereafter the R122BL contacts shift to reverse position to that shown to provide a holding circuit for relay R122. When the resistor 855 cools, contacts R122A reopen.

Energization of relay R122 closes contacts R122BU (Fig. 35e) and completes a circuit to energize relay R123.

With R123 energized, relay contacts R123A close to place a further resistor 856 in parallel with the series connected resistors 852 and 853. With resistor 856 in such circuit additional amperage of 2 amps. flow to the lamp, which now consumes a current of 4 amps.

Still referring to Fig. 35e, with relay R123 energized, relay contacts R123B close and establish a circuit to and through a resistor 857, through the R124BL contacts in the position shown, to the other side of the D. C. line. Heating of the resistor 857 causes closure of the contacts R124A. Closure of contacts 124A establishes another circuit through R124 and R125 which are in parallel. R124 energizing shifts R124BL to reverse position to provide a holding circuit for R124 and R125. R124A opens upon the cooling of resistor 857.

The closure of relay contacts R124BU (Fig. 35e) places another resistor 858 (Fig. 35a) in shunt with resistor 856, thus increasing the amperage consumption of the tube of the lamp 130 up to about 6¼ amps.

To prevent the machine from starting until the lamp 130 is burning at its rated current, relay contacts 125AU are provided. These are inserted in the conditioning circuit for the R134 relay (see Figs. 35e and 35b).

Closure of relay contacts R125AL (Fig. 35f) close the circuit starting from line 761 (Fig. 35b), via wire 806, wire 780 (Fig. 35f), contacts R125AL now closed, via wire 779 (see also Fig. 35b), through the now closed relay contacts R128BU, to and through the white signal lamp 778, and to the other side of the line 760.

If the machine is standing with the film clutch latched up as it would be when the film is threaded into the camera, no light will strike the photocell 844 pertaining to the eighty-first column, because the sprocket shutter will be closed. As soon as the machine is started, the shutter will open and relay R128 will energize, thus closing contacts R128BU and lighting the white signal lamp 778.

The circuit to energize relay R128 will now be described. Referring to Fig. 35f, starting from the T4 transformer on line 800, current flows through the now closed R127A contacts, via line 801 (see also Fig. 35b), relay coil R128, wire 802 (see also Fig. 35f), through the now closed R101AU contacts, via wire 859, to the plate of thyratron 860. This is the thyratron pertaining to the eighty-first column. Light striking the photocell 844 causes current flow from the point 791, through R100BL contacts now closed (Fig. 35f), via line 843 to the photocell 844 (Fig. 35b), across the photocell, through resistor 861, and down via wire 795 (Fig. 35f) to the negative side of resistor 792. Current flows through resistor 861 (Fig. 35b), causing the control grid of the thyratron 860 to become less negative with respect to ground; thereupon the thyratron is rendered conductive so that current will flow from plate to cathode and back to ground. This current flow completes the circuit to relay R128, energizing the relay. The purpose of resistor 862 is to limit flow of current from the grid of the thyratron to the cathode.

Condenser 863 is the customary filter condenser used in photocell circuits in this class.

The various conditioning controls for relay R134 have now been explained and the energizing circuit for this relay will now be traced completely. Referring to Fig. 35b, from line 761, the circuit is completed through the shifted R102AU contacts, through the closed R136AU contacts, through the mirror shift switch contacts 179, through the R112AU contacts in the position shown, via wire 817, to Fig. 35e, through the R121BL contacts now closed, through the shifted R100BU contacts, through the closed R125AU contacts, via wire 818 (see Figs. 35f and 35b), to relay coil R134, and back to the other side of the D. C. line.

With R103 and HD4 energized (Fig. 35b) in the manner previously described, upon closure of contacts R102BU, relay contacts HD4a close and supply alternating current to the primaries of the filament transformers T9 to T14 inclusive. These transformers are the transformers which supply filament current to all the thyratrons except thyratron 785 which has its own filament supply. Thyratrons such as 860 and the other eighty thyratrons, some of which are shown in Fig. 35b, all have their filament supply from one or the other transformers T9 to T14. The filament circuits between the transformers and the thyratrons are not shown in the diagram.

It will be assumed that blank cards are in the supply magazine P of the punch and that the camera has been loaded with suitably exposed and developed film. The presence of the cards in the magazine causes relay R3 to be energized in the manner previously explained, and the presence of film in the camera causes energization of relays R4, R6, and R35 in the manner previously described.

Plug connections are established between plug sockets 870 (Fig. 35d) to the plug sockets 871 which are connected to the punch magnets PM. The PM punch magnets are the PM punch magnets shown in Fig. 3 of the Lake Patent No. 2,032,805.

The machine can now be put into operation by depression of the start key 781. Referring to Fig. 35c the customary circuit is provided through 761, and contacts 821. Closure of the start key will permit current to flow through the shifted R6BL contacts, through the R25BU contacts in the position shown, and R1BU contacts in the position shown, through the now shifted R3BL contacts, through the now closed R134AU contacts, to and through relay R10 and back to line 760.

Relays R9 and HD1 are energized and hold with the R10 relay as heretofore explained for the "card to film" operation.

Referring to Fig. 35a, a circuit will be established, through the now shifted R9BU contacts, the closed R10BL contacts, the shifted R137AU contacts, through the R133A contacts in the position shown, through cam contact C1, to the punch clutch magnet 828.

With the punch clutch 828 energized, the first card will be fed to the die station in the punch closing the DCL contact (Fig. 35b), and causing closure of the relays R141 and R1. An energizing circuit is also provided for relay R133 through relay contacts R139BL now closed, relay contacts R103AU now closed, to relay R113. With the R133 relay energized, relay contacts R133A shift and interrupt the circuit to the punch clutch magnet 828. The punch feed will latch up at the end of the first cycle.

With R133 energized near the end of the first cycle, contacts R133BL will close and allow a circuit to be established from line 761, through R9BU, R10BL now closed, the camera clutch magnet 829, the cam contacts C8, the R133BL contacts, through the shifted R138AL contacts, to the line 760.

Energization of the film clutch magnet near the end of the first cycle will provide for film feed in the second cycle.

The film will continue to feed until the start notch in the film is sensed by the notch sensing devices shown in Fig. 22. When the start notch is sensed, switch 550 (Figs. 22 and 35b) is momentarily opened, causing deenergization of relay R130. Upon such deenergization relay contacts R130BL resume the position shown in the drawing to establish a circuit through these contacts, through relay contacts R140BU, to relay coil 132. Upon energization of relay R132, relay contacts R132A will close (see Fig. 35a) which completes the following circuit: From line 761, through relay contacts R9BU now closed, through contacts R10BL now closed, through the shifted R137AU contacts, through contacts R132A now closed, through the shifted R133A contacts, cam contacts C1, to the punch clutch magnet 828. Accordingly, on the cycle following the sensing of the start notch in the film, cards will again feed in synchronism with the film.

It may be mentioned that the start key can be released after the first card has been fed to the punch brushes inasmuch as relay R7 will have been energized and the relay contacts R7AL will have been shifted completing the holding circuit for relay R10.

The index point designation marks on the film, which are in the form of transparent areas, will affect their related photocells, which photocells are similar to photocell 844 previously described, but which are associated with thyratrons 860a (see Fig. 35d). It will be understood that there is a photocell 844a for each of the eighty columns of the record card and each photocell controls its related thyratron 860a to cause such thyratron to become conductive when light passes through the transparent spot on the film in the related column. The photocells 844a receive current in the same manner that photocell 844 receives current, but, for simplicity in the wiring diagram, supply lines for the photocells 844a are omitted.

It is sufficient to state that when a photocell such as 844a receives light from a transparent portion of the film at an index point position, the grid potential of the related thyratron 860a will be rendered less negative with respect to the cathode, whereupon current will flow from the plate of the related thyratron to the cathode.

Accordingly, under these conditions, circuits will be completed from the positive side of the line 761 (Fig. 35d), through the now closed P1 cam contacts, thence through the customary pair of circuit breaker contacts 880 which are in parallel with each other, thence through a single circuit breaker contact 881, to a line 882.

To prevent arcing at the break circuit contact 881 a supplemental circuit breaker 883 is provided which has an associated network comprised of two resistors 884 and two condensers 885. This circuit network suppresses arcing at contacts 881 and 883. The current impulses on line 882 flow through the now shifted R137BU contacts, through the R135AL shifted contacts, through the closed R136AL contacts, to a line 836, thence through the shifted R137BL contacts, through the closed R25BL contacts to the punch magnets PM.

As previously explained, plug connections are established between the plug sockets 871 and the related plug sockets 870 for the 860a thyratrons.

When a particular thyratron 860a is rendered conductive under the control of its related photocell 844a, the plate to anode circuit of such thyratron becomes conductive so that current may flow through the related punch magnet PM, whereupon punching of an index point perforation will be effected in the corresponding card column. Punching of record cards will be effected for each film frame, one record card being punched for each film frame. Such punching operations will continue until the stop notch in the film is sensed by the devices illustrated in Fig. 22.

When the stop notch in the film is sensed, switch 560 (Fig. 22 and Fig. 35b) is shifted to open position, whereupon relay R131 will be deenergized. Deenergization of this relay will allow contacts R131AU to open, interrupting the circuit to relay coil R132.

With relay R132 deenergized, relay contacts R132A are opened, thereby interrupting the circuit to the punch clutch magnet 828. With this punch clutch magnet deenergized, the feeding of the cards will stop at the end of the cycle in which the notch of the film was sensed. The film in the camera unit will continue to feed until the end of the film has been fed off the supply reel. Operations will then terminate in the same manner which has been described for card to film operations. The film can then be removed from the machine.

*Comparing circuits and comparing operations*

It is occasionally desirable to compare a film with the cards which were utilized for the original preparation of the film. Such comparing operations are desirable for checking purposes.

Comparing devices for comparing punched cards against source cards are shown and described in the patent to C. D. Lake No. 2,174,702. In the Lake patent, if there is an error in the punched cards in a particular column, with respect to the punched data on the source cards, a mechanism will indicate the column in which there is a discrepancy and the machine operation will be terminated.

The present machine utilizes such comparing mechanism, but in lieu of comparing data from source cards to punched cards, the data which is compared is data from source cards with respect to data photographically recorded on the film.

To condition the machine for comparing, plug connections 750 and 840 are removed and a new plug connection 887 is established (see Fig. 35b). The mirror (see Fig. 34) is placed in the film to card position. With plug connection 887 in place, relay R139 (Fig. 35b) will be energized. With relay R 139 energized, its relay contacts R139AU close and energize relay R102. This is the same relay which is energized for film to card operations. The circuits which were utilized for film to card operations are the same except for three circuits. The energized relay R139 modifies these three circuits.

With relay R139 energized, relay contacts R139AL (Fig. 35b) are closed and complete a circuit which places relay R133 under control of relay R2 and cam contacts P6 instead of under control of the die card lever DCL.

Referring to Fig. 35d, this circuit is established from lines 761, through the shifted R138AU contacts, the closed R2AL contacts, cam contact P6, to line 830, thence to Figure 35b, and through the now closed R139AL contacts, to and through relay coil R133, to line 760. The purpose of this circuit control is to feed the first card to the punch brushes instead of to the punch die position, which was the feed provided on film to card operations.

With relay R139 energized (Fig. 35b), contacts R139BL open to interrupt the circuit from the DCL contacts. The circuit which is interrupted is the circuit which on film to card operations extended to relay R133. On film to card operations this circuit was established by relay contacts R103AU.

With relay R139 energized, contacts R139BU open in the circuit which extends through the film clutch magnet 829 (Fig. 35a). The purpose of contacts 139BU will be explained later under the heading of "Miscellaneous Control Circuits."

In the before-mentioned Lake Patent No. 2,174,702 the comparing magnet circuits for each column comprise two differentially wound coils (see CHM1, Fig. 4 of the Lake patent). Two plug connections are provided for each comparing magnet coil, namely J5A and J5B in the Lake patent.

According to the present invention, plug sockets are provided, 888 and 889. In plugging up the machine for comparing operations, plug connections are established between sockets 888 and sockets 751. Sockets 889 are plugged up to related thyratron sockets 870.

Operations for comparing are initiated in a similar manner to film to card operations, which has been previously described. If the transparent spots on the film check or match with index points perforated on corresponding cards, the differentially wound bucking coils, CHM in the comparing unit, will buck one another and machine operations will continue. In case there is a discrepancy between the transparent mark on the film and the perforation in the card only one of the coils will be energized. This will cause stopping of the machine operations and the lighting of the signal light.

On comparing operations, provided the film frames compare with perforations on the source cards, simultaneous circuits are established from line 761, through the circuit breakers 880, 881 and 883, through the shifted 137BU contacts, through the closed 135AL contacts, the closed 136AL contacts, to line 836, thence through the shifted R137BL contacts, the closed R25BL contacts, thence to a wire 890, through the now closed R7BL contacts, thence through one of the coils of CHM, to plug socket 889, thence via plug connection to sockets 870, and back to the other side of the line. The bucking circuit extends through contacts R7BL by the path previously traced, through the other coil in a particular column, to a plug socket 888, thence to a plug socket 751, thence through the perforation of the card under the brushes, and on through the closed R7BU contacts, through the shifted 138BU contacts, and back via wire 886 to the other side of the line.

If a discrepancy occurs between a perforation in a card and a supposedly corresponding mark, namely a transparent area of the film, one of the coils CHM will be energized and the comparing devices shown in Fig. 1 of the Lake Patent No. 2,174,702 will be effective to shift contacts 821 to reverse position from that shown in Fig. 35c. Contacts 821 correspond to contacts 601 and 602 in the above-mentioned Lake patent.

On a non-comparison operation, the contacts 821 will shift to reverse position from that shown. With such contacts shifted, the energizing circuit for relay R10 which extends through contacts 821 will be interrupted. This circuit, which need not be completely traced, extends through stop key contacts 832, the closed R128AL contacts, the closed R134AL contacts, the closed R140AU contacts, up via line 833, etc., to the relay coil R10. Relay coil R10 will become deenergized near the end of the cycle in which the non-comparison occurred upon the opening of cam contacts F2 and P5 (Fig. 35c).

With relay coil R10 deenergized, contacts R10BU assume the position shown so that, with the 821 contacts in shifted position, a circuit is completed from line 761, through the shifted 821 contacts, down through the R10BU contacts, to and through relay coil R25, and back to line.

With R25 energized, a stick circuit is established through the R25AL contacts. With contacts 821 shifted, another circuit is completed through a signal lamp 893, this circuit going back to the 760 side of the line.

The deenergization of relay R10 allows contacts R10AL (Fig. 35c) to assume open position and thus cause deenergization of HD1 and relay R9. Deenergization of HD1 and relay R9 will terminate machine operations.

When operations are terminated by the above comparing operation, indication of the column in which an error is present will be effected by the devices shown in Figs. 1 and 2 of Lake Patent No. 2,174,702.

When the machine is stopped, following a non-comparison, the operator can simply mark the film frame with suitable colored ink or crayon. The film frame in question would be the one on the exit side of the film sprocket. The card which is in question is partway through the punch and that card can be advanced to the punch mechanism and suitably marked.

After such a stoppage, the comparing unit may be restored to normal position in the manner explained in the Lake Patent No. 2,174,702. Thereafter the start key may be depressed and new operations initiated on succeeding film frames and cards.

Comparing operations will be eventually terminated when the stop notch is encountered in the film. It can then be removed and selected marked portions compared with selected marked cards.

*Miscellaneous control circuits*

Assuming that the machine is performing card to film operations, under these conditions should a card fail to feed, the machine will be stopped automatically because DCL contacts open since the card fails to reach the punching die. This will cause deenergization of relay coil R1 with attendant opening of R1AU which will in turn cause deenergization of R10 (Fig. 35c). Opening of R10AL contacts, upon deenergization of R10, will cause deenergization of R9 and HD1.

Upon such machine stoppage, due to failure of a card to feed, the operator can remove the defective card and either replace it or repair it.

Following such a machine stoppage, the position of the cards in the punching section will be as follows: A previous card will be in a position approaching the punch brushes. There will be no card at the die station. If the start key is depressed, following such a condition, the first card adjacent the brushes will be fed out of the machine past the brushes and the following card will go to the punch die station. In this same cycle, film feed should occur to record on the film the data on the card which was approaching the punch brushes when the machine stopped. With these conditions, on the next cycle there should be no film feed but a card feed only to get the card, which was formerly at the die, up to a point approaching the punch brushes. In the next or third cycle, there should be both card feed and film feed.

Provision is made in the present machine to provide controls to take care of the foregoing conditions. Failure of a card to feed causes the die card lever DCL to open, deenergizing relays R1, R2, R141, R133 (Fig. 35b). The R1AU contacts open the holding circuit for relay R10, causing the machine to stop. Deenergization of relay R10 (Fig. 35c) causes deenergization of HD1 and R9 in the manner previously explained. Opening of contacts R9BL (Fig. 35a) and R10BL cuts off current supply to both the camera clutch magnet 829 and the punch clutch magnet 828. Both one-revolution clutches will latch up at the end of this cycle.

While contacts R133BL (Fig. 35a) open under this condition, contacts R141A reclose to the position shown in Fig. 35a. Accordingly, since contacts R113BL are now closed a shunt circuit is provided around the now open R133BL contacts by a path which extends through R141A and the now closed R113BL.

On the next depression of the start key there will be a concurrent energization of the punch clutch magnet 828, and the film clutch magnet 829. 829 will be energized through the shunt path previously described and the 828 magnet will be energized through the R133A contacts which are now in position shown. In this way, on the next cycle there will be concurrent card feed and film feed. Near the end of the first cycle the lowermost card in the punch magazine will be fed to the punch die and operate die card lever contacts DCL (Fig. 35b) and energize relays R141 and R1. With R141 energized, the R141A contacts (Fig. 35a) will reopen and thus prevent a film feed during the following second cycle. With relay R1 energized (Fig. 35c) contacts R1BL will be closed and upon closure of cam contacts P3 a circuit will be established to energize relay R2.

With R2 energized, a holding circuit will be established through the holding coil and contacts R2AU, the holding circuit extending via line 894 (Fig. 35b), to and through the DCL contacts. During the second cycle, which is a card feed cycle only, film feed being suppressed, upon closure of P6 (Fig. 35d) a circuit will be established from line 761, through the shifted R138AU contacts, and the shifted R2AL contacts, through cam contacts P6, to line 830 (see also Fig. 35d), which circuit extends through the now closed R113BU contacts, through relay coil R133 to the other side of the line.

With R133 energized, the R133BL contacts (Fig. 35a) will close and the R133A points will shift to reverse position from that shown. With the foregoing contacts R133BL and R133A in shifted position, there will be a concurrent energization of both the film clutch magnet 829 and the punch clutch magnet 828 so that in the next cycle there will be a concurrent feed of cards and film. Similarly, on following cycles there will be concurrent feed of card and film.

On comparing operations, relay R139 is energized and relay R113 is deenergized, the relay contacts 139BU now take the place of the R113BL contacts. In all other respects the operations are the same as for card to film operations and the same sequence of card feed and film occurs in case of the failure of a card to feed in the punching section of the machine.

If the machine is performing "film to card" operations and a card should fail to feed, the sequence of events is somewhat different from that described for card to film operations. In this case, with film to card operations, the machine stops with no card about to pass through the punching die. After the operator has repaired or replaced the card which failed to feed, the first cycle after the failure to feed should be a card feed cycle only, in order to get a card up to the die after which the cards and film should feed in unison or concurrently. Failure to feed a card causes the DCL contacts to open, deenergizing relays R1, R2, R141, and R133 (Fig. 35d). The machine will stop because of the opening of the relay contacts R1AU (Fig. 35c) which are in the holding circuit for relay R10. Relay contacts R133BL (Fig. 35a) open in the film clutch magnet circuit and the R133A contacts shift back to the normal or as-shown position in the punch clutch magnet circuit. Contacts R139BU and R113BL are both open. Accordingly, when the start key is depressed, the punch clutch magnet will become energized through the R133A contacts in the position shown. However, a circuit will not be completed to the film clutch magnet because of the open R133BL contacts.

As soon as a card is fed to the die and contacts DCL close, a circuit will be completed from line 761, through the DCL contacts, through the now closed R139BL contacts, through the closed R103AU contacts, to and through relay coil R133, to the other side of line 760.

With R133 thus energized, contacts R133BL (Fig. 35a) will be closed so that, on the following cycle, there will be both film feed and card feed.

Upon termination of either a "card to film" or a "film to card" operation and after the film has been removed from the camera unit until the last few cards will still not have passed completely through the punching unit. In order to advance these cards to the stacker, the following circuits are employed. A switch 815 (Figs. 12 and 35c) is provided which upon its closure completes a circuit from line 761, switch 815, closed relay contacts R134BU, coil of relay R129 to line 760. Relay coil R129 being energized, the R129AL contact points close to complete a branch circuit to energize relay coil R10. The energization of relay coil R10 causes energization of relays R9 and HD1 in a manner previously explained. The HD1A points (Fig. 35a) complete a circuit to the driving motor 827 as previously explained. With relay R129 energized, the R129BL contact points (Fig. 35a) are closed and complete a circuit from line 761, closed R9BU points, closed R10BL contact points closed R129BL contact points, now shifted R133A points, cam contacts C1, punch clutch magnet 828 to line 760. With the punch clutch magnet 828 and the driving motor 827 both energized, the cards remaining in the machine will be advanced to the stacker. It was preferred to route the circuit through switch 815 and relay coil R129 through the contacts R134BU because relay R134 is the before-mentioned conditioning relay which is energized only when the machine is properly conditioned for operation. For the normal card clearing operation just described it is preferred to route the circuit through the before-mentioned R134BU points as the completion of this circuit is an indication to the operator that the machine is properly conditioned.

Referring to Fig. 11 where the mirror is tilted to throw an enlarged image of the film on the ground glass screen 142, it is at times desired to feed film and observe the moving image of the film on the screen 142. To enable this to be accomplished, additional switches 816 (Fig. 35b) and 841 (Fig. 35a) are provided. Switch 816 completes a circuit (Fig. 35c) from line 761 through switch 816 directly to and through the relay coil R129. Energization of relay coil R129 will cause energization of the driving motor 827 and punch clutch magnet 828 in a manner previously explained. The circuit through switch 816 and relay coil R129 does not go through the R134BU contacts in this instance due to the fact that when the mirror is in the "screen" position which is the full line position as shown in Fig. 33 the switch 181 is open and the contacts 179 are also open thus making it impossible to energize relay R134. Switch 841 (Fig. 35a) when closed, places the film clutch magnet directly across the D. C. lines 761 and 760 thus keeping it energized. With the film clutch magnet 829 and the driving motor 827 energized film will be fed by the sprocket and the moving image of the film can be observed on the ground glass screen 142.

When film is to be inspected by digital or index point positions, the operator will momentarily close switch 841 (Fig. 35a) to energize film clutch magnet 829 and thus release the dog on the one revolution clutch (Fig. 17a). Shaft 238 is then free for rotation by hand. This can be effected by manually turning flywheel 250 (Fig. 17). In this way the film can be fed slowly and stopped at any point where critical inspection is desired.

Referring to Figs. 35c and 37, relay coil R13 becomes energized near the end and beginning of each machine cycle by the circuit which extends from line 761 through the C4 cam contacts, relay coil R13 to line 760. With relay coil R13 energized, the relay contacts R13B are open and prevent the energization of relay coil R9, upon closure of the R10AL contact points, near the end or beginning of a machine cycle. This arrangement provides for the closure of the R9BU contact points (Fig. 35a) at a time in the cycle so that the film clutch magnet 829 and the punch clutch magnet 828 will receive full duration current impulses from their respective cam contacts C2 and C1.

It will be noted that relay coil R24 (Fig. 35c) is in circuit with cam contacts RC2 across lines 761 and 760. The RC2 cam contacts are closed for all "card to film" or "film to card" operations and accordingly relay R24 will be energized and the R24B contacts (Fig. 35c) will be closed. The R24B contacts are of use only on card to card operations.

I claim:

1. A machine for transferring data from perforated record cards to photographic film, comprising means for feeding said cards and said film in synchronism, in combination with means for maintaining the film in uniform motion during exposure, means for sensing the perforations in said card, selectively operable shutter means for controlling exposure of the film whereby a film is exposed to correspond to the sensed perforations.

2. A machine for transferring data from perforated record cards to photographic film, comprising means for feeding said cards and said film in synchronism, in combination with means for maintaining the film in uniform motion during exposure, means for sensing the perforations in said cards, a light source, normally open shutter means under the control of said sensing means to block passage of light to said film only when a perforation is sensed, whereby sensed perforations are represented by transparent spots on the film.

3. A machine for transferring data from perforated record cards to photographic film, comprising means for feeding said cards and said film in synchronism, in combination with means for sensing the perforations in said cards, means for exposing the film while it is in continuous motion and means under the control of said sensing means for interrupting film exposure to provide a film which when initially developed produces an opaque background bearing transparent portions representative of the related record perforations.

4. A machine for transferring data from perforated record cards to photographic film, comprising means for feeding said cards and said film in synchronism, in combination with means for sensing the perforations in said cards, means for exposing the film while it is in continuous motion and shutter means under the control of said card sensing means for interrupting film exposure whereby there is produced on said film a series of frames each corresponding in miniature to a particular card and each frame being opaque except for transparent spots which are differentially disposed in the frame corresponding to the perforations in a selected card.

5. The invention set forth in claim 4 in which means is provided for producing a transparent line between frames on said film.

6. The invention set forth in claim 4 in which supplemental light control means is provided for producing a continuous transparent line on the film adjacent the ends of said frames.

7. The invention set forth in claim 4 in which shutter means is operable intermittently in timed relation to the movement of the film for producing a transparent line between frames on said film.

8. The invention set forth in claim 4 in which supplemental light control means are provided for producing a transparent line between frames on the film and for producing a continuous transparent line of the film adjacent the ends of said frames.

9. A machine for transferring data from perforated record cards to photographic film, comprising means for feeding said cards and said film in synchronism, in combination with means for sensing the perforations in said cards, and optical means for producing on said film transparent images representative of said perforations which are disposed on the film in differential relationship conforming to the differentially disposed perforations on the card, said optical means including shutter means under control of said sensing means.

10. Means for moving photographic film continuously across a thin sheet of light whereby all the film surface is normally exposed during the film movement, in combination with means for momentarily shielding selected portions of said film from said light whereby said portions are left as clear, transparent spots on said film.

11. Means for maintaining a thin sheet of light across the path of a continuously moving photographic film, comprising in combination, an opaque wall, a narrow slit in said wall, a lamp behind said wall whereby a sheet of light issues from said slit, a lens between said slit and said film, an instrumentality for continuously moving the film and means for momentarily intercepting said light sheet at selected positions whereby portions of the film may remain unexposed and transparent.

12. Means for maintaining a thin sheet of light across the path of a continuously moving photographic film whereby the entire film is normally rendered opaque by exposure, in combination with controllable devices for selectively shielding portions of said film from said light whereby said portions of said film may remain unexposed and transparent.

13. Means for maintaining a thin sheet of light across the path of a continuously moving photographic film whereby the entire film is normally rendered opaque by exposure, in combination with devices controllable by perforated cards for selectively shielding portions of said film from said light whereby said portions of said film may remain unexposed and transparent.

14. The invention set forth in claim 13 in which said controllable devices comprise shutters movable selectively to obstruct desired portions of said light sheet.

15. The invention set forth in claim 13 in which said controllable devices comprise shutters movable selectively by perforated cards to obstruct desired portions of said light sheet.

16. Means for maintaining a thin sheet of light across the path of a continuously moving photographic film, comprising in combination, an opaque light barrier having a long narrow slit lengthwise in its wall, an elongated lamp behind said light barrier whereby a sheet of light issues from said slit, a lens between said slit and said film, and means for intermittently interrupting the sheet of light issuing from said slit whereby an image of said slit is produced on said film at spaced points along its length.

17. In a machine for transferring data from perforated record cards to photographic film, said cards having a plurality of index point positions in a plurality of columns, and certain of said positions having perforations, perforation sensing means, means for feeding said cards step-by-step in the direction of the columns for successively presenting the index point positions thereon to said sensing means, means for simultaneously and continuously moving said film through a sheet of light whereby said film is normally exposed over its entire width, a shutter corresponding to each columnar position, and means under the control of said sensing means when a perforation in said card is sensed for moving the shutter corresponding to the columnar position thereof to block the perforated index point position of such column against the passage of light thereby leaving on the film an unexposed transparent area corresponding in position to the position of such perforation.

18. The invention as set forth in claim 17 in which means is provided in synchronism with the movement of said card for producing a transparent line across said film between successive frames thereof.

19. In a machine adapted to perform "card to film" and "film to card" reproducing operations the combination comprising, instrumentalities for transferring indicia from cards to film, and instrumentalities for transferring indicia from film to cards, in which a plurality of light intercepting elements constitute a field over which multiple diverging light beams must be spread but to which they must also be confined, a film, a nonrotatable lens having its optical axis in alignment with the center of the field, and means mounting said lens for movement in an axial direction for controlling the position of said lens between said film and said field, whereby the light beams passing therethrough may be accurately positioned with respect to said field.

20. The combination according to claim 19 in which the light intercepting elements constitute normally open shutters which are closable for selectively interrupting said light beams.

21. The combination according to claim 19 in which the light intercepting elements are light responsive devices.

22. The combination as defined in claim 19 in which the film is guided along a predetermined path by a pair of yieldingly associated guide members which are maintained at equi-distant points from the center line of the predetermined path.

23. In a machine adapted for "film to card" operation and "card to film" operation, two sets of light intercepting elements, one of which sets comprises photocells which are utilized on "film to card" operations and the other set comprising shutters which are utilized on "card to film" operation, a common lens which is utilized in both operations, a plurality of sources of light which are selectively used for the foregoing operations, means for directing light to the photocells, and means for modifying the light path passing through the common lens selectively according to the desired type of operation, said means comprising a movable mirror shiftable to one position in which light passing through the film and lens can reach the means directing light to the photocells and then reach the photocells and to another position in which light beams can impinge on the film through the lens when permitted by the shutters.

24. The invention according to claim 23 wherein a viewing screen is provided, and with the movable mirror disposed in a third position in which light passing through the film and lens is diverted to the viewing screen.

25. The invention according to claim 23 wherein control means are provided for conditioning the machine for alternative different types of machine operation with means responsive to the position of the movable mirror for selectively controlling the said control means according to the position of the movable mirror.

26. A "film to card" machine including a plurality of sets of photocells spaced to one side of, to the other side of and directly below a common axial line, a mirror assembly mounted on said common axial line, and including one set of mirrors inclined to divert light to the set of photocells to one side of the axial line, another set of mirrors spaced from the foregoing set and inclined to direct light to the set of photocells and the other side of the axial line, said spaces between said sets of mirrors affording paths to the photocells which are disposed below the axial line.

27. The invention according to claim 26 wherein a light source and a film are provided together with a lens system to direct light through the film and to diverge the light beams to the common axial line.

28. In a machine of the "card to film" and "film to card" type having means for feeding film and record card feeding means and including in combination means for initiating film feed, and means for controlling the record card feeding means, means to sense a notch on the edge of the film, means controlled by such sensing means for controlling the aforesaid control means for the record card feeding means to initiate card feed when a notch is sensed and for thereafter maintaining record card feed.

29. The invention according to claim 28 wherein dual sensing means are provided to sense notches on both edges of the film, with means under control of one sensing means to initiate record card feed and means under control of the other sensing means to terminate record card feed.

30. A machine of the "card to film" and "film to card" type, film exposing means for exposing film on "card to film" operations, light projecting means to project light through the film on "film to card" operations, photocells receiving light from the film on "film to card" operations, a viewing screen receiving light projected through the film, means for selectively conditioning the machine for performing either of three operations, film viewing, card to film operations and film to card operations, said last named means comprising a movable mirror for altering the paths of light and means for shifting it to either of three positions, one for viewing operations, another for "card to film" operations and to a third position for "film to card" operations so that light can reach the photocells.

31. The invention according to claim 30 wherein machine control means are provided which are selectively called into operation under control of parts which assume different positions in accordance with the position of the movable mirror.

32. A convertible "card to film," "film to card" and film viewing machine, in which a sheet of light is directed along a predetermined path and through one side of a film for the "card to film" operation and through the other side of the film and along substantially the same path in the "film to card" operation and in the film viewing operation, instrumentability for transferring indicia from cards to film, including means for directing a sheet of light from a first position along said path, and through the one side of the film, instrumentalities for transferring indicia from film to cards, including means at a second position for receiving light, directed through the other side of said film substantially along said path, instrumentalities for visual viewing of the indicia on the cards and film, including means at a third position for receiving light directed through the other side of the film substantially along said path, at least two of said positions being out of said path of light, means to condition the machine for "film to card" operations, means to condition the machine for "card to film" operations, and means to condition the machine for viewing operations, said conditioning means including light deflecting means, and means for selectively shifting said deflecting means into and out of light deflecting position in said path and for shifting the deflecting means when positioned in said path, whereby light may be selectively directed between each of said three positions and said film along said path, and interlocking controls for preventing improper operation of the machine.

References Cited in the file of this patent

UNITED STATES PATENTS

| Number | Name | Date |
|---|---|---|
| 1,072,152 | Ocampo | Sept. 2, 1913 |
| 1,303,099 | Michaelson | May 6, 1919 |
| 2,016,506 | Maluss et al. | Oct. 8, 1935 |
| 2,071,527 | Holloway | Feb. 23, 1937 |
| 2,172,330 | Bryce | Sept. 5, 1939 |
| 2,194,879 | Von Mihaly et al. | Mar. 26, 1940 |
| 2,203,000 | Smith | June 4, 1940 |
| 2,220,474 | Bryce | Nov. 5, 1940 |
| 2,224,761 | Dickinson et al. | Dec. 10, 1940 |
| 2,224,762 | Dickinson et al. | Dec. 10, 1940 |
| 2,282,029 | Bryce | May 5, 1942 |
| 2,307,880 | Croft et al. | Jan. 12, 1943 |
| 2,322,602 | Terry | June 22, 1943 |
| 2,348,051 | Blakely | May 2, 1944 |
| 2,365,707 | Kile et al. | Dec. 26, 1944 |
| 2,377,573 | Potts | June 5, 1945 |
| 2,395,181 | Hags | Feb. 19, 1946 |
| 2,448,830 | Robbins et al. | Sept. 7, 1948 |
| 2,458,926 | Bassett | Jan. 11, 1949 |
| 2,560,395 | Steed | July 10, 1951 |